US012093375B2

United States Patent
Endler et al.

(10) Patent No.: US 12,093,375 B2
(45) Date of Patent: Sep. 17, 2024

(54) GENERATING AND MONITORING FICTITIOUS DATA ENTRIES TO DETECT BREACHES

(71) Applicant: SpyCloud, Inc., Austin, TX (US)

(72) Inventors: David Endler, Austin, TX (US); Alen Puzic, Austin, TX (US); Edward Ross, Austin, TX (US)

(73) Assignee: SpyCloud, Inc., Austin, TX (US)

( * ) Notice: Subject to any disclaimer, the term of this patent is extended or adjusted under 35 U.S.C. 154(b) by 902 days.

(21) Appl. No.: 16/776,877

(22) Filed: Jan. 30, 2020

(65) Prior Publication Data

US 2020/0279050 A1 Sep. 3, 2020

Related U.S. Application Data

(60) Provisional application No. 62/812,205, filed on Feb. 28, 2019.

(51) Int. Cl.
*G06F 21/55* (2013.01)
*G06F 9/54* (2006.01)
(Continued)

(52) U.S. Cl.
CPC ............ *G06F 21/554* (2013.01); *G06F 9/542* (2013.01); *G06F 16/144* (2019.01);
(Continued)

(58) Field of Classification Search
CPC ........ G06F 21/16; G06F 21/55; G06F 21/552; G06F 21/554; G06F 21/6218; H04L 63/1491
See application file for complete search history.

(56) References Cited

U.S. PATENT DOCUMENTS

| 8,880,435 B1 * | 11/2014 | Catlett | ................ H04L 63/1491 |
| | | | 705/75 |
| 9,009,829 B2 * | 4/2015 | Stolfo | ................... G06F 21/552 |
| | | | 726/23 |

(Continued)

FOREIGN PATENT DOCUMENTS

| AU | 2013100873 A4 * | 7/2013 | ............. G06F 21/46 |
| WO | WO-2010118135 A2 * | 10/2010 | ........... G06F 21/554 |

OTHER PUBLICATIONS

Stapleton, Jeff, and Ralph Spencer Poore. "Tokenization and other methods of security for cardholder data." Information Security Journal: A Global Perspective 20.2 (2011): 91-99. (Year: 2011).*

(Continued)

*Primary Examiner* — Luu T Pham
*Assistant Examiner* — Paul J Skwierawski
(74) *Attorney, Agent, or Firm* — Pillsbury Winthrop Shaw Pittman, LLP

(57) ABSTRACT

Provided is a process that includes: obtaining a fictitious data entry associated with a field present in a plurality of records associated with an online resource; sending a query to a monitoring application, the query specifying the fictitious data entry and a request to determine whether a second repository of compromised data includes the fictitious data entry; in response to the query, receiving query results indicating that the second repository of compromised data includes the fictitious data entry; in response to the received indication that the second repository of compromised data includes the fictitious data entry, identifying at least some of the first set of one or more repositories that store the data entry; designating other data entries within the at least some of the first set of one or more repositories as potentially having been breached; and storing the designation in memory.

24 Claims, 14 Drawing Sheets

(51) Int. Cl.
*G06F 16/14* (2019.01)
*G06F 18/214* (2023.01)
*G06F 21/31* (2013.01)
*G06F 21/62* (2013.01)
*G06N 20/00* (2019.01)
*H04L 9/06* (2006.01)

(52) U.S. Cl.
CPC ............ *G06F 18/214* (2023.01); *G06F 21/31* (2013.01); *G06F 21/6218* (2013.01); *G06N 20/00* (2019.01); *H04L 9/0643* (2013.01)

(56) References Cited

U.S. PATENT DOCUMENTS

| | | | | |
|---|---|---|---|---|
| 9,462,013 | B1 * | 10/2016 | Boss | H04L 63/1416 |
| 9,639,589 | B1 * | 5/2017 | Theimer | G06F 21/00 |
| 10,410,014 | B2 * | 9/2019 | Allen | G06F 21/6245 |
| 10,445,514 | B1 * | 10/2019 | Brandwine | G06F 21/6209 |
| 10,521,584 | B1 * | 12/2019 | Sharifi Mehr | H04L 63/1433 |
| 10,574,697 | B1 * | 2/2020 | McClintock | H04L 63/1491 |
| 10,834,130 | B2 * | 11/2020 | Erez | G06F 21/554 |
| 10,873,601 | B1 * | 12/2020 | Stickle | H04L 63/1416 |
| 11,138,246 | B1 * | 10/2021 | Waugh | G06F 16/322 |
| 11,698,727 | B2 * | 7/2023 | Mehta | G06F 3/0653 707/692 |
| 2004/0058705 | A1 * | 3/2004 | Morgan | G07F 7/1008 455/90.3 |
| 2005/0108247 | A1 * | 5/2005 | Heinla | H04L 67/101 |
| 2011/0126273 | A1 | 5/2011 | Bhatia et al. | |
| 2012/0324555 | A1 * | 12/2012 | Chambers | G06F 15/173 726/6 |
| 2013/0191630 | A1 | 7/2013 | Ylonen et al. | |
| 2013/0191631 | A1 | 7/2013 | Ylonen et al. | |
| 2013/0298181 | A1 * | 11/2013 | Smith | H04L 63/1491 726/1 |
| 2014/0143401 | A1 | 5/2014 | Carlen et al. | |
| 2014/0281578 | A1 * | 9/2014 | Bennison | H04L 9/3236 713/189 |
| 2015/0288702 | A1 * | 10/2015 | Choe | H04L 63/102 726/1 |
| 2016/0057166 | A1 | 2/2016 | Chesla | |
| 2016/0381023 | A1 * | 12/2016 | Dulce | H04L 63/1408 726/9 |
| 2017/0053115 | A1 * | 2/2017 | Healy | G06Q 20/20 |
| 2017/0213052 | A1 * | 7/2017 | Michel | G06Q 30/06 |
| 2017/0304707 | A1 | 10/2017 | Morton et al. | |
| 2018/0068124 | A1 | 3/2018 | Medvedev | |
| 2018/0166399 | A1 | 6/2018 | Tehranipoor et al. | |
| 2018/0191678 | A1 | 7/2018 | Polcha et al. | |
| 2018/0330121 | A1 * | 11/2018 | Margalit | H04L 63/1408 |
| 2018/0330122 | A1 * | 11/2018 | Margalit | H04L 63/08 |
| 2018/0373868 | A1 * | 12/2018 | Kimhi | H04L 63/1491 |
| 2018/0374071 | A1 * | 12/2018 | Israeli | G07G 1/0009 |
| 2019/0028557 | A1 | 1/2019 | Modi et al. | |
| 2019/0083876 | A1 | 3/2019 | Morton et al. | |
| 2019/0286617 | A1 * | 9/2019 | Abu-Abed | G06N 20/00 |
| 2019/0372932 | A1 | 12/2019 | Polcha et al. | |
| 2020/0153836 | A1 * | 5/2020 | Johnson | H04L 63/1416 |
| 2020/0279050 | A1 * | 9/2020 | Endler | G06F 21/6218 |

OTHER PUBLICATIONS

David Endler, U.S. Appl. No. 16/667,367, filed Oct. 29, 2019, Detecting Use of Compromised Security Credentials in Private Enterprise Networks.
David Endler, U.S. Appl. No. 16/667,447, filed Oct. 29, 2019, Filtering Passwords Based on a Plurality of Criteria.
David Endler, U.S. Appl. No. 16/667,486, filed Oct. 29, 2019, Determining the Intersection of a Set of Compromised Credentials with a Set of Active Credentials with Data Structures and Architectures that Expedite Comparisons.
David Endler, U.S. Appl. No. 16/667,522, filed Oct. 29, 2019, Detecting Use of Passwords that Appear in a Repository of Breached Credentials.
David Endler, U.S. Appl. No. 16/776,877, filed Jan. 30, 2020, Generating and Monitoring Fictitious Data Entries to Detect Breaches.
David Endler, U.S. Appl. No. 16/777,005, filed Jan. 30, 2020, Measuring Data-Breach Propensity.
Internet Archive of "SPECOPS," https://web.archive.org/web/20180730112318/https://specopssoft.com/product-category/desktop-management/ dated Jul. 30, 2018.
Specops Password Policy—Enterprise password security, https://4sysops.com/archives/specops-password-policy-enterprise-password-security/ dated Jun. 23, 2016.
Release Notes, SPECOPS, https://specopssoft.com/support/password-policy/release-notes.htm dated Jul. 5, 2021.
Van Dyke, Jackson, "Checking for Breached Passwords in Active Directory," https://jacksonvd.com/checking-for-breached-passwords-in-active-directory/ dated Aug. 14, 2017.
RSI Security "What You Need to Know About Nist Password Guidelines," https://blog.rsisecurity.com/what-you-need-to-know-about-nist-password-guidelines/ dated Sep. 12, 2018.
Internet archive of https://haveibeenpwned.com/ captured Oct. 30, 2018.
Internet archive of https://breachalarm.com/ captured Oct. 29, 2018.
Internet archive of https://en.wikipedia.org/wiki/Agloe,_New_York captured Oct. 17, 2018.
Hatmaker, Taylor, "Credit Karma expands its identity theft monitoring tool to include dark web data," https://techcrunch.com/2018/04/24/credit-karma-dark-web-id-monitoring/ Apr. 24, 2018.
Internet archive of https://en.wikipedia.org/wiki/Password_policy captured Jan. 21, 2019.
Internet archive of https://haveibeenpwned.com/ captured Mar. 10, 2019.
U.S. Appl. No. 16/667,367 titled "Detecting Use of Compromised Security Credentials in Private Enterprise Networks" filed Oct. 29, 2019.
U.S. Appl. No. 16/667,447 titled "Filtering Passwords Based on a Plurality of Criteria" filed Oct. 29, 2019.
U.S. Appl. No. 16/667,486 titled "Determining the Intersection of a Set of Compromised Credentials with a Set of Active Credentials with Data Structures and Architectures that Expedite Comparison" filed Oct. 29, 2019.
U.S. Appl. No. 16/667,522 titled "Detecting Use of Passwords that Appear in a Repository of Breached Credentials" filed Oct. 29, 2019.
U.S. Appl. No. 16/777,005 titled "Measuring Data-Breach Propensity" filed Jan. 30, 2020.

\* cited by examiner

GENERATING AND MONITORING FICTITIOUS DATA ENTRIES TO DETECT BREACHES

CROSS-REFERENCE TO RELATED APPLICATIONS

This application claims benefit of U.S. Provisional Patent Application 62/812,205, titled "Generating and Monitoring Fictitious Data Entries to Detect Breaches," filed 28 Feb. 2019. The entire content of the aforementioned patent filing is hereby incorporated by reference.

BACKGROUND

1. Field

The present disclosure relates generally to cybersecurity and, more specifically, to generating fake data entries to identify a data breach.

2. Description of the Related Art

Computer-security professionals are losing the battle to prevent use of stolen or otherwise exposed security credentials, such as passwords, by which users are authenticated by computer networks. In part, this is due to poor, prevalent password hygiene. People tend to reuse passwords or use low-entropy variations. And these passwords (a term used generically herein to refer to knowledge-factor and biometric security credentials), along with associated user identification, can be easily exposed or stolen, which can help threat actors access various sensitive accounts related to a user. A report by Verizon™ in 2017 indicated that 81% of hacking-related breaches leveraged either stolen or weak passwords and in July 2017 Forrester™ estimated that account takeovers would cause at least $6.5 billion to $7 billion in annual financial losses across industries. Other attack vectors include brute force attacks. Modern GPU's and data structures like rainbow tables facilitate password cracking at rates that were not contemplated when many security practices were engineered. Malicious actors can sell resulting tested credentials on the dark web, making it relatively easy to monetize user credentials and incentivizing even more password cracking. Various malicious buyers of this information may use password and user identification combinations in order to breach and retrieve highly confidential information.

To impede these attacks, online services like "Have I Been Pwned" have arisen. Such systems maintain a database of breached credentials and expose an interface by which the records may be interrogated by users seeking to determine if their credentials have been compromised. Such systems, however, are often too rarely accessed, particularly in the context of enterprise networks, where highly valuable information can be exfiltrated relatively quickly after credentials are compromised. And responses to detected threats are often not fully implemented, as propagating appropriate changes throughout an enterprise network can be relatively high-latency and complex.

SUMMARY

The present techniques quickly identify data breaches by generating fake data entries and determining whether the fake data entries have been compromised. The present techniques also provide an indication of the strength of cybersecurity/network security measures employed by an entity by computing an identity score for the entity.

The following is a non-exhaustive listing of some aspects of the present techniques. These and other aspects are described in the following disclosure.

Some aspects include a process that includes: obtaining a fictitious data entry associated with a field present in a plurality of records associated with an online resource; sending a query to a monitoring application, the query specifying the fictitious data entry and a request to determine whether a second repository of compromised data includes the fictitious data entry; in response to the query, receiving query results indicating that the second repository of compromised data includes the fictitious data entry; in response to the received indication that the second repository of compromised data includes the fictitious data entry, identifying at least some of the first set of one or more repositories that store the data entry; designating other data entries within the at least some of the first set of one or more repositories as potentially having been breached; and storing the designation in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
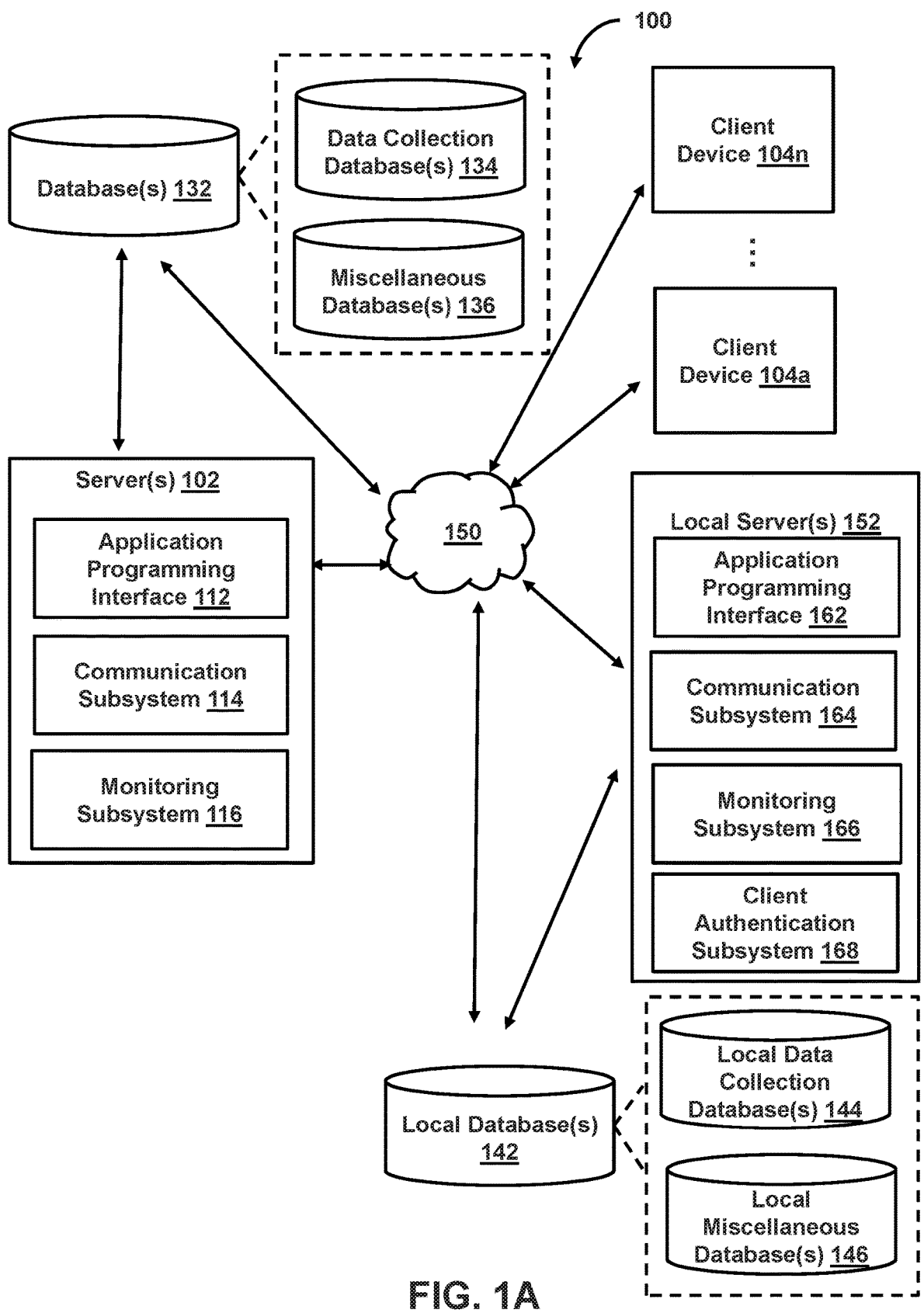
FIG. 1A is a logical and physical architecture block diagram showing an example system for aggregating compromised user credentials and notifying users that their credentials are compromised.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, it should be understood that some embodiments are problem-specific, and not all embodiments address every problem with traditional systems described herein or provide every benefit described herein. That said, improvements that solve various permutations of these problems are described below. Some aspects of the present techniques are described below under different headings in all-caps. These techniques may be used together or independently (along with the description above), which is not to suggest that other descriptions are limiting.

Some embodiments mitigate some of the above-described issues (or other problems described below or that will be self-evident to those in the field) by generating fake data entries (also referred to as fictitious data entries) and determining whether these fake data entries are found in a repository of compromised credentials. Generating fake data entries and determining whether the fake data entries are found in a repository of compromised credentials is expected to allows one to determine whether other data entries (for example, username/password combinations, credit card numbers, or other sensitive information) that are, for example, stored in the same database as the fake data entries have potentially been breached/compromised. Some embodiments are configured to notify an administrator of a network accessible resource (for example, private computer networks, online resource/service, online accounts, internet accessible email, social media accounts, online document repositories) or one or more users of a potential breach of these other data entries. Some embodiments mitigate some of the above-described issues (or other problems described below or that will be self-evident to those in the field) by computing an identity score for an entity based on several factors (for example, whether username/password combinations have been exposed, date of exposure of the username/password combinations, a number of username/password combination exposures, and exposure of national identifiable number, a passport number, a driver's license number, or a credit card number, etc.). The identity score of the entity may be utilized to analyze a security threat associated with the entity or may provide an indication of the strength cybersecurity/network security measures employed by the entity.

Existing techniques to generate fake entries, like copyright traps, are often not well suited for detecting certain types of breaches. If done wrong, faked are readily detected by a threat actor and filtered from data dumps. In some cases, such fakes can be detected based on failure to exhibit properties of non-fictitious entries. Examples include passwords that fail to comply with password rules, e.g., requirements that the password be more than 8 characters, have a non-alphanumeric character, have a numeric character, and have an upper and lowercase character. Other examples include checksums and other forms of internal redundancy in entries, like the Luhn Number Checksum in credit cards. Or street addresses or phone numbers that fail to comply with a valid syntax. Some embodiments may generate fake entries that are difficult to detect as such, e.g., by randomly or systematically selecting fake-entry components consistent with these constraints and determining that the resultant fake entry does not match an existing entry in the same field of existing or later added records. None of which is to suggest that fake, invalid entries, or any other subject matter is disclaimed, e.g., some embodiments may intentionally generate fake invalid entries to avoid the risk of collisions with non-fictitious entries.

Some embodiments may further systematically vary which fake entries are stored in a database (or other repository) at any given time and keep track of when entries are stored. Those logs may later be accessed when a fake entry is detected in a breach to infer when the breach occurred. In some cases, different fake entries may be inserted at query time by a database management system and logged along with access credentials of the party making the request. Upon detecting a fake entry in a dump after a breach, embodiments may associate the breach with the credentials of the party making the query for which the detected fake entry is inserted to potentially identify a source of a breach.

Some embodiments may determine identity scores indicative of an organization's cybersecurity practices. Some embodiments may determine an aggregate score based on a frequency with which credentials of members of the organization appear in breaches. Further, some embodiments may calculate this score or other dimensions of a multi-dimensional score based on indicia of password strength within an organization. In some cases, these scores may also be based on instances in which the fake entries described above appear in records of breaches.

FIG. 1A illustrates a computing environment 100 having components configured to generate data entries (for example, fake data entries) to detect a potential breach of other data entries (so as to impede efforts by a threat actor to exploit sensitive information) and to compute identity scores of entities (which can be used to analyze a security threat associated with the entity). As illustrated in FIG. 1A, computing environment 100 may include servers 102, client devices 104a-104n, databases 132, local databases 142, and local servers 152. Server 102 may expose an application programming interface (API) 112 and include a communication subsystem 114 and a monitoring subsystem 116. Local server 152 may expose an API 162 and include a communication subsystem 164, a monitoring subsystem 166, a client authentication subsystem 168, or other components (which is not to suggest that other lists are limiting).

Two client devices are shown in FIG. 1A, but commercial implementations are expected to include substantially more, e.g., more than 100, more than 1,000, or more than 10,000. Each client device 104 may include various types of mobile terminal, fixed terminal, or other device. By way of example, client device 104 may include a desktop computer, a notebook computer, a tablet computer, a smartphone, a wearable device, or other client device. Users may, for instance, use one or more client devices 104 to interact with one another, one or more servers, or other components of computing environment 100.

Figure 1B:
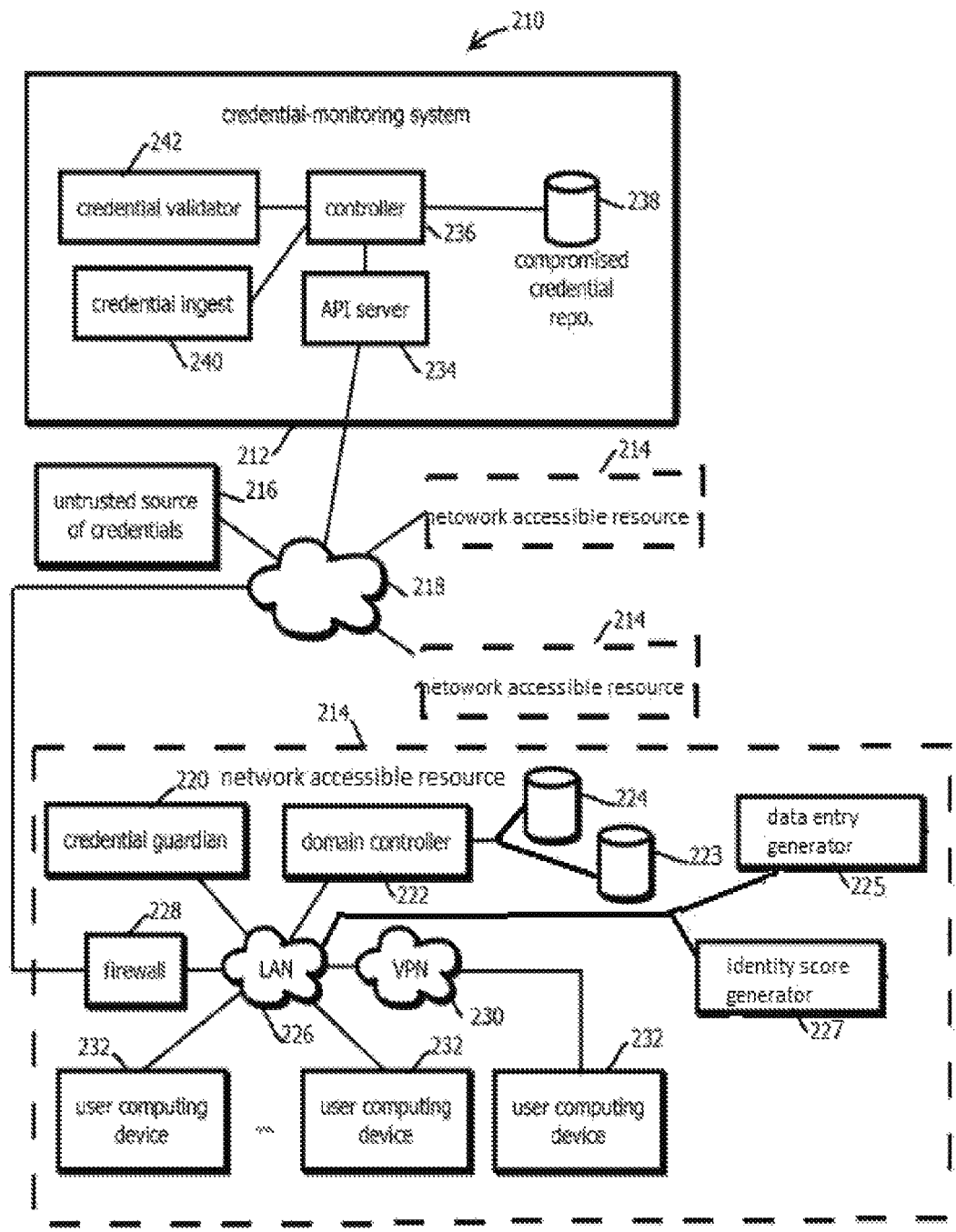
FIG. 1B is a logical and physical architecture block diagram showing another example system for aggregating compromised user credentials and notifying users that their credentials are compromised.

FIG. 1B is a logical and physical architecture block diagram showing another example of a computing environment 210 having a credential-monitoring system 212 (for example, an identity management system) and a network accessible resource 214 configured to mitigate some of the above-described problems. In some embodiments, the computing environment 210 is, in some aspects, a more specific version of that described above. In some embodiments, the computing environment 210 includes the credential-monitoring system 212, a plurality of different network accessible resources 214, an untrusted source of leaked credentials 216, and a public network, like the Internet 218. It should be noted that, while one or more operations are described herein as being performed by particular components of credential monitoring system 212 or network accessible resource 214, those operations may, in some embodiments, be performed by other components of credential monitoring system 212, network accessible resource 214, or other components of computing environment 210. As an example, while one or more operations are described herein as being performed by credential monitoring system 212, controller 222, credential guardian 220, data entry generator 225, or identity score generator 227, those operations may, in some embodiments, be performed by other components of credential monitoring system 212 or network accessible resource 214.

Three network accessible resources 214 are shown in FIG. 1B, though embodiments are consistent with substantially more. In some embodiments, each network accessible resource 214 may correspond to a different network accessible resource of a different tenant account subscribing to services from the credential-monitoring system 212, for example, in a software as a service offering, or some embodiments may replicate some or all of the system 212 on-premises. In some embodiments, each of the network accessible resources 214 may define a different network accessible resource domain in which authentication and authorization determinations are independently made, for instance, a user authenticated on one of the network accessible resources 214 may not be afforded any privileges on the other network accessible resources 214 in virtue of the authentication. In some cases, each network accessible resource 214 may be a different enterprise network, for instance, on a private subnet hosted by a business or other organization. Examples of network accessible resources 214 may include private computer networks, online resources/services, online accounts, internet-accessible email, social media accounts, online document repositories, etc.

In some embodiments, the network accessible resource 214 may include the above-noted credential guardian 220, a controller 222, user account repositories 223 and 224, data entry generator 225, a private local area network 226, identity score generator 227, a firewall 228, a virtual private network connection 230, various user computing devices 232, and various network-accessible resources for which access is selectively granted by the controller 222 responsive to authorization and authentication determinations based on user credentials. Generally, authentication is based on confirming the identity of an entity, and authorization is based on whether that entity is permitted to access resources in virtue of being authenticated. In some embodiments, the user computing devices 232 may be physically co-located, or some user computing devices may be remote, for instance, those connecting via a virtual-private network (VPN) connection 230. Three user computing devices 232 are shown, but commercial implementations are expected to include substantially more, and in some cases with substantially more remote computing devices connecting via a plurality of different VPN connections. In some embodiments, the local area network 226 may be addressed by a range of private Internet Protocol addresses assigned to the various illustrated computing devices, and in some cases, those same private Internet Protocol addresses may be used on other network accessible resources 214, for instance, behind a network address translation table implemented by the firewall 228 or a router.

In some embodiments, the controller 222 may be an Active Directory™ domain controller or other identity management service configured to determine whether to service authentication requests from user computing devices 232 or other network resources (e.g., computing devices hosting services to which the devices 232 seek access). In some embodiments, the controller 222 may receive requests including a username and one or more security factors, like a knowledge factor credential, such as a password, a pin code, or in some cases, a value indicative of a biometric measurement. The terms "password" and "credential" refer both to the plain-text version of these values and cryptographically secure values based thereon by which possession of the plain-text version is demonstrated, e.g., a cryptographic hash value or ciphertext based on a password. Thus, in some embodiments, these inputs may be received in plain text form, or cryptographic hash values based thereon, for instance, calculated by inputting one of these values and a salt value into a SHA 256 cryptographic hash function or the like, may serve as a proxy.

In some embodiments, the controller 222 may respond to authentication requests by retrieving a user account record from the repository 224 corresponding to the username (a term which is used to refer broadly to refer to values, distinct from knowledge-factor credentials, by which different users are distinguished in a username space, and which may include pseudonymous identifiers, email-addresses, and the like) in association with the request. In some embodiments, in response to the request, the controller 222 may determine whether a user account associated with the username (e.g., uniquely associated) indicates that the user account has a valid set of credentials associated therewith, for instance, that a password has been registered and has not been designated as deactivated, e.g., by setting a flag to that effect in the account to deactivate a previously compromised (e.g., breached, phished, or brute forced) password. In response to determining that the user account does not have a valid set of credentials associated therewith, some embodiments may respond to the requests by denying the request, and supplying instructions to populate a user interface by which new credentials may be registered and stored in the user account.

In some embodiments, in response to determining that the user account has valid credentials, the controller 222 may then determine whether the credentials associated with the request for authentication match those in the user account record, for instance, whether the user demonstrated possession of a password associated with the username in the user account. Possession may be demonstrated by supplying the password in plain text form or supplying a cryptographic hash thereof. In some embodiments, passwords are not stored in plaintext form in the user account repository 224 and cryptographic hashes (for example, farm hashes) of passwords in the user account are compared to cryptographic hashes of user input credentials to determine whether the user has demonstrated possession of the password. In response to determining that the credentials associated with the request do not match those in the user account, in some embodiments, the controller 222 may respond to the request by transmitting a signal indicating that the request is denied to the requesting computing device 232.

In some embodiments, in response to determining that the credentials supplied with the request match those in the user account, some embodiments may respond to the request by authenticating the user and, in some cases, authorizing (or causing other services to authorize) various forms of access to network resources, including access to email accounts, document repositories, network attached storage devices, and various other network-accessible services accessible (e.g., exclusively) on the network accessible resource 214 (e.g., selectively based on the requestor's identity). In some embodiments, upon authentication, various computing devices 232 on the network accessible resource 214 may indicate to one another that they are authorized to access resources on one another or otherwise communicate, e.g., with the Kerbos security protocol, such as the implementation described in RFC 3244 and RFC 4757, the contents of which are hereby incorporated for by reference.

In some embodiments, the controller 222, in response to an authentication determination, may advance the user name to a key distribution center service, which may respond by issuing a ticket-granting ticket. The ticket granting ticket may be a time stamped record, and the record may be encrypted with a secret cryptographic (e.g., in a symmetric or asymmetric cryptographic protocol) key of the key distribution center. The ciphertext may be then transmitted to the user computing device 232. The user computing device 232 may store the received ciphertext in memory for use in communicating with other computing devices on the network accessible resource 214.

Subsequently, an authenticated computing device may receive a request to communicate with another computing device on the network accessible resource 214, e.g., from user input or an application thereon seeking to update state. In response, a secure session may be established between the initiating device and the other computing device. To this end, the ciphertext stored in memory of the initiating computing device may be transmitted to the key distribution center, for instance to its ticket granting service. The ciphertext may be sent in association with an identifier of the computing device to which the requesting computing device has been requested to communicate. The ticket granting service may verify the name of the computing device to which communication is requested, for instance, confirming that it is on a list of permitted computing device identifiers, and the ticket granting service may determine that the ciphertext (e.g., upon decryption or signature verification with a public key) indicates that the ticket is not expired and that the ticket was encrypted with the ticket granting service's secret key. (A negative determination either of these determinations may result in a determination not to authorize the session in some embodiments.) In some embodiments, the ticket granting service may issue a ticket and session keys to the requesting computing device, which may then be sent to the other computing device to which communication is requested. The other computing device may verify the ticket and the session keys to determine whether to respond to the request. Communications in the session may be associated with these values, and each device may verify that each message in the session demonstrates possession by the other device of the appropriate credentials.

In some embodiments, the ciphertexts may expire and be renewed. For instance, some embodiments may determine based on the timestamp of a current ciphertext (or session credentials) by the ticket granting service, the ciphertext is expired, and embodiments may cease to be operative to authorize communication between computing devices. In some embodiments, the user computing device associated with the ciphertext may detect that the ciphertext has expired and automatically request an updated ciphertext. In some embodiments, the determination to grant an updated ciphertext may include querying the credential guardian 220 to determine whether the user credentials upon which the initial authentication determination were based have been subsequently compromised and detected by the credential monitoring system 212. In such an event, in some embodiments, the controller 222 and user computing device 232 may receive a message from the ticket granting service indicating that the domain credential guardian 220 indicates the credentials are compromised and declined to renew the ciphertext (or session credentials), thereby preventing subsequent communication based upon the compromised user credentials. In some embodiments, the user may be invited to designate new user credentials by sending a message to the user computing device 232 instructing the user computing device 232 to present the interface by which new credentials are registered with the controller 222.

In some embodiments, the controller 222 may be an Active Directory™ domain controller, and the network accessible resource 214 may be a Windows™ domain network. In some embodiments, the credential guardian 220 periodically or in response to various events obtains credentials that have been compromised from the credential-monitoring system 212 or from another source that populates a database with compromised credentials (as described below with regard to FIGS. 2 and 3), for instance every 15 minutes, every hour, every day, or every week, or in response to an event, like a new credential, a new compromised credential, or the like.

In some embodiments, in response, the credential guardian 220 may obtain an updated set of compromised credentials, and in some cases with an update that is based on, and specifies, a difference relative to a previous update to reduce bandwidth and memory usage.

Some embodiments may iterate through a set of updated compromised credentials or existing credentials in the data repository 224 to compare the credentials in the data repository with those that have been designated by the credential monitoring system 212 as having been compromised. In some embodiments, the controller 222 may be configured to transmit a message indicating a new credential event to the credential guardian 220 when (e.g., in response to an event in which) a user changes or adds new credentials, and the credential guardian 220 may execute a comparison between the new credentials, for instance applied in the message or associated with the message to those that have been previously designated by the credential-monitoring system 212 as having been compromised. In some embodiments, the comparison is performed within the network accessible resource 214 by the credential guardian 220 via a comparison to downloaded compromised credentials, for instance, to avoid transmitting credentials from the data repository outside the network accessible resource 214 and to expedite the comparison. Or in some cases, the comparison may be performed remotely by the credential-monitoring system 212, for instance, by transmitting the credentials in the updated user account record to the credential monitoring system 212 to perform the comparison and send a message indicating a result. In some cases, the transmitted credential may be transmitted in the form of a cryptographic hash of that credential for comparison with cryptographic hashes of compromised credentials using the same cryptographic hash function and salt, like SHA 256 or MD5 hashes, so that comparisons are performed without having access to the credential outside the network accessible resource 214.

Scaling is expected to present challenges with naïve approaches in some implementations. In some embodiments, the number of compromised credentials and the number of credentials in the data repository may be relatively large, for instance, greater than 100,000, greater than 1 million, greater than 10 million, or greater than 100 million distinct entries corresponding to different distinct sets of credentials (e.g., password/username pairs). Performing a pairwise comparison between the two sets may be a relatively computationally expensive operation, particularly when the comparisons are time sensitive operations to detect potential breaches. Various data structures may be implemented to expedite the operation. Examples include content addressable data structures. For example, embodiments may compare the two sets (e.g., determine the intersection by selecting each entry in one set also present in the other) with a hash table. Some embodiments may store (e.g., store a pointer to, or store a copy of) a compromised credential or subset of the compromise credentials at an address in an array that corresponds to some or all of an output of a hash value based on the credential stored at that address. For example, a 10 digit prefix or suffix of a SHA 256 cryptographic hash of a credential may serve as an index into an array where compromised credentials that produce the same prefix or suffix in the same cryptographic hash function are stored. Some embodiments may perform a comparison by inputting the credential in question from the user account repository into the same hash function, determining the same prefix or suffix as an index into the same array, retrieving each of the compromised credentials at that address, and comparing each of the responsive compromised credentials to the credential in question in the user account repository 224, thereby relatively rapidly identifying a relatively small subset of compromised credentials to compare.

Other embodiments may implement other data structures to expedite the comparisons. Examples include implementations that store compromised credentials in binary trees (e.g., and implement a binary search), sorted lists, prefix trees, radix trees, or other data structures that afford relatively fast access to entries based upon the content of those entries, such that for a given credential from the data repository 224, potentially matching compromised credentials can be identified relatively quickly (or vice versa). In some embodiments, comparisons may be performed probabilistically, for instance, with a bloom filter or a cuckoo filter. A bloom filter is a space-efficient probabilistic data structure that is used to test whether an element is a member of a set. The bloom filter supports two operations: test and add. Test is used to check whether a given element is in the set or not. For example, if it returns false, then the element is definitively not in the set and if it returns true, then the element is probably in the set. The operation add simply adds an element to the set. Bloom filters help reduce expensive disk (or network) look-up for non-existent keys.

Some embodiments may expedite comparisons through concurrent operations. For example, some embodiments may perform comparisons in a MapReduce framework, for instance mapping sets of compromised credentials and sets of user account credentials to nodes in a cluster computing architecture based on hashes thereof, and reducing out results indicating which credentials match those that have been compromised with a reducing function. In some cases, concurrency may be expedited with heterogenous processing hardware. Some embodiments may implement concurrency with comparisons on a graphical processing unit, for instance performing relatively large number of concurrent comparisons with concurrently operating pixel shaders. Some embodiments may implement the comparison with field programmable gate arrays or other bespoke hardware, for instance, on content addressable memory implemented in a hardware associative array in which a term in a query maps to set of physical hardware addresses by a random-access memory architecture.

In some cases, comparisons are performed sequentially for different parts of a set of credentials, e.g., first usernames of username/password pairs may be compared to produce a set of partial matches, and then passwords may be compared within the set of partial matches to produce a set of full matches. In some cases, usernames (or passwords) may be matched on a character-by-character, exact basis. Or some embodiments may designate usernames with some amount of difference as matching. For example, some embodiments may parse domain names from email-usernames, e.g., stripping the @mailsever and dot com, from an email address, and then matching to the remaining prefix to detect instances in which the same prefix is used as a username on other services. Some embodiments may match usernames within a threshold edit distance, like within a threshold Levenshtein distance. Some embodiments may apply stemming wildcard operators by which threshold amounts of prefix or suffix characters are disregarded when matching or serve as the exclusive basis for matching within the username field. Some embodiments normalize usernames to a canonical representation and then match the canonical representation, e.g., by converting all characters to the same case (e.g., uppercase) and stripping suffixes designating domain names.

In some embodiments, the credential guardian 220 may register various usernames, passwords, or cryptographic hashes thereof with the credential monitoring system 212, and the credential monitoring system 212 may determine (e.g., with any of the preceding comparison techniques) whether values related to the registered usernames, passwords, or cryptographic hashes thereof have appeared in records of compromised credentials. In response to detecting this scenario, the credential monitoring system 212, in some cases, may transmit a message, such as an event record, to the credential guardian 220, and an event handler of the credential guardian 220 may disable the corresponding credential via the controller 222 by sending an instruction to the controller 222 to update a corresponding user account record to designate the credential as invalidated, causing the controller 222 to force the user to supply a new set of credentials in some cases.

Thus, comparisons may be performed on the credential guardian 220, in the (e.g., remote or on-premises) credential-monitoring system 212, and comparisons may be performed responsive to an updated set of compromised credentials, an attempt to use a credential, a new credential a user is attempting to register, or a periodical batch process being run.

In some embodiments, the credential guardian 220 and the credential monitoring system 212 may be co-located on the same network accessible resource 214, or in some cases portions may be implemented as a software as a service model in which the same credential-monitoring system 212 is accessed by a plurality of different network accessible resources 214 hosted by a plurality of different tenants. The credential guardian 220 and the credential monitoring system 212 collectively form an example of a distributed application. Also, a password management application (for example, installed on a computing device), a browser extension application (for example, installed on a computing device), and the credential-monitoring system 212 collectively form an example of a distributed application. Other examples of such an application are described with reference to FIG. 1A. The components are described as services in a service-oriented architecture (e.g., where different functional blocks are executed on different network hosts (or collections thereof) and functionality is invoked via network messages). But embodiments are consistent with other design patterns, e.g., the credential guardian 220 and the controller 222 may be integrated in the same host or process, the credential guardian 220 may operate as an agent on each of the user computing devices, or the credential guardian 220, the controller 222, and the credential-monitoring system 212 may be integrated on a single host or process. The credential guardian 220 may operate as a password management application and a browser extension application installed on a computing device.

In some embodiments, the credential-monitoring system 212 may include an application program interface server 234, such as a nonblocking server monitoring a network socket for API requests and implementing promises, callbacks, deferreds, or the like. In some embodiments, the controller 236 may implement the processes described herein by which credentials are obtained, and in some cases cracked, validated, stored, and interrogated. In some embodiments, at the direction of the controller 236, for instance responsive to commands received via the server 234, credentials stored in a compromised credential repository 238 may be interrogated to return an updated full set, or result of comparison to credentials determined to have been potentially compromised with the techniques described herein. In some embodiments, the controller 236 is further configured to ingest credentials with the credential ingest module 240 from various remote sources, such as an untrusted source of credentials 216 via the Internet 218. Examples of sources of credentials are described below and include various repositories on the dark web. In some embodiments, received credentials may undergo various types of processing with credential validator 242, for instance, de-duplicate credentials with those previously determined to have been compromised, cracking credentials published in encrypted form, and associating credentials with other user identifiers. Results may be stored in the compromised credential repository 238 and in some cases, one or more the above-described data structures by which compromised credentials are compared with those in user account repository 224 may be updated.

The systems of FIGS. 1A and 1B may execute various processes like those described above and below, though following processes are not limited by the above implementations, which is not to suggest that any other description herein is limiting. It should be noted that the various processes executed by one or more components of the network accessible resource 214 in FIG. 1B may be executed by one or more of local server 152, client device 104, and local database 142 in FIG. 1A (or vice versa), and the various processes executed by one or more components of the credential-monitoring system 212 in FIG. 1B may be executed by one or more of server 102 and database 132 in FIG. 1A (or vice versa). In other words, the above or below discussed processes executed by one or more components of the computing environment 210 may be executed by one or more components of the computing environment 100 (or vice versa). The repositories and databases discussed in this disclosure may include in-memory data structures, program state, and the like.

Obtaining Compromised Confidential Information

Various approaches may be executed to obtain compromised (e.g., breached, brute forced, or phished) confidential information, like compromised credentials, leaked personally identifiable information (like social security numbers), or financial credentials like account numbers, for purposes of detecting that the information has been compromised. The database 132 and local database 142 illustrated in FIG. 1A or the repository 238 of FIG. 1B may be populated by collecting data from a plurality of sources and using a plurality of data collection techniques. Although a compromised credential repository 238 is illustrated in FIG. 1B as being part of a credential-monitoring system 212, it should be understood that network accessible resource 214 may also include another repository including compromised credentials (i.e., the compromised credentials stored in the compromised credential repository 238). Data corresponding to leaked or stolen assets (including user credentials) may be collected using multiple techniques and from many sources. Some of the techniques for collecting leaked or stolen assets include (a) human intelligence (HUMINT) and applied research (HUMINT+TECHNOLOGY) and (b) scanners and automatic collection tools. HUMINT is an information gathering technique that uses human sources, and may include such a human source acquiring a copy of a set of compromised credentials from the dark web. Both the techniques noted above may be implemented in some cases. Although the scanners and automatic collection tools may be relatively efficient at collecting information from the regular web, manual techniques may be needed in some use cases to collect leaked or stolen assets from the deep or dark web, which is not to suggest that purely automated approaches or any other technique is disclaimed.

The above noted techniques, alone or in combination, collect data from several sources. These sources include, but are not limited to (which is not to imply other lists are limiting), private sources, covert sources, active account takeover (ATO) combination lists, stolen assets, infected users, open sources, private forums, dark web markets, tor hidden services, and pastes. Once the data is collected, the data may be cleansed by putting the collected data through a rigorous quality-control process to determine the value of the collected data. After the data is cleansed, a database may be populated based on the cleaned data.

Figure 2:
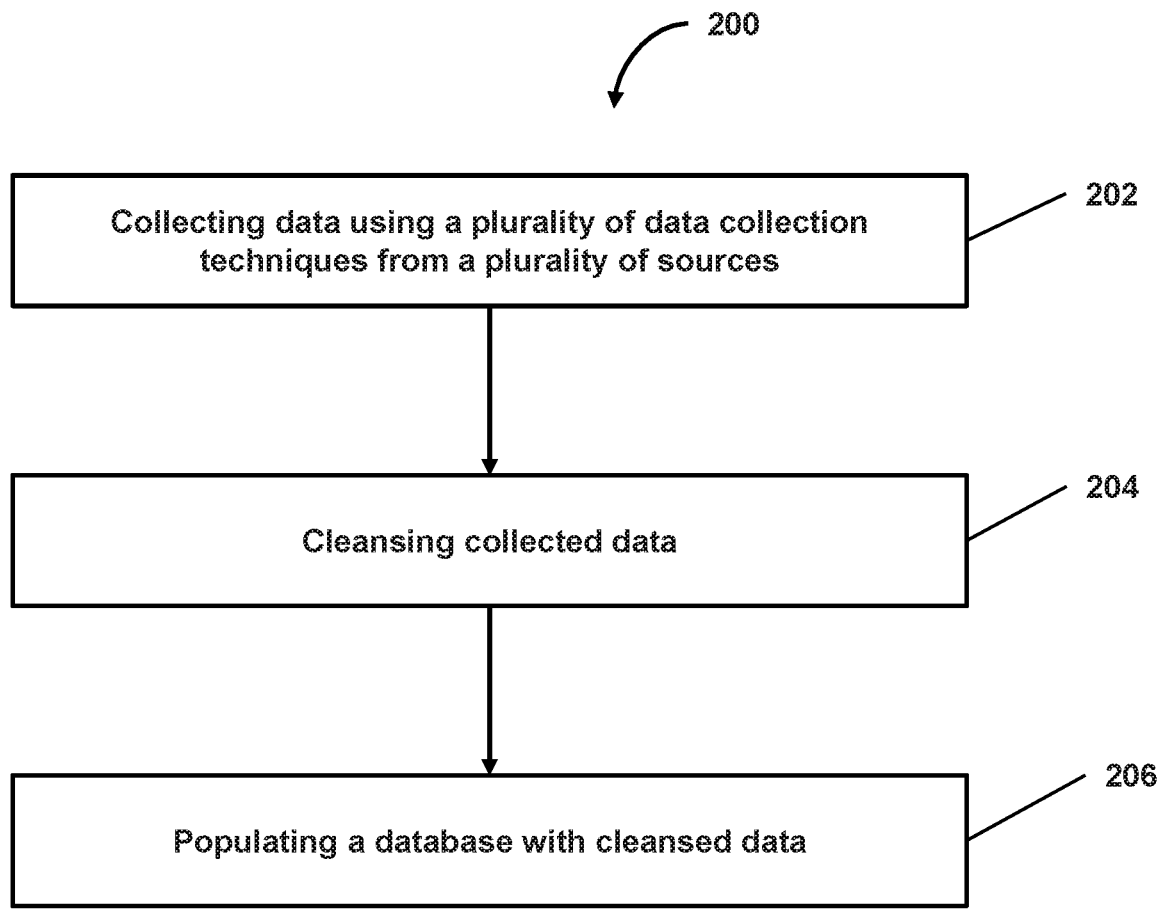
FIG. 2 is a flow chart that illustrates an example process of populating a database suitable for use in the system of FIG. 1A or 1B.

FIG. 2 illustrates an example process 200 of obtaining compromised credentials. The process 200, like the other processes described herein, may be implemented by executing instructions stored on a tangible, machine-readable medium with one or more processors, in some cases, with different processors executing different subsets of the instructions and with different physical memory or computing devices storing different subsets of the instructions. The processes (which includes the described functionality)

herein may be executed in a different order from that depicted, operations may be added, operations may be omitted, operations may be executed serially, or operations may be executed concurrently, none of which is to suggest that any other description is limiting. In some embodiments, the processes herein may be implemented in one or more processors (e.g., a term which refers to physical computing components, like a central processing unit, a GPU, a field-programmable gate array, application-specific integrated circuits, and combinations thereof). The processing devices may include one or more devices executing some or all of the operations of the method in response to instructions stored on an electronic, magnetic, or optical storage medium.

In step 202, in some embodiments, data (for example, exposed or stolen data related to personally identifiable information) may be collected using a plurality of data collection techniques from a plurality of sources.

After the data is collected, in step 204, the collected data may be cleansed by putting the data through a rigorous quality-control process to determine the value of the collected data. The cleansing of the collected data may include several steps (examples of which are discussed in more detail below with reference to FIG. 3). The cleansing steps include parsing, normalizing, removing duplicates, validating, and enriching. Once the data is cleansed, in step 206, a database may be populated with the cleansed data. This data may then be used to determine whether one or more passwords match a password used by a user to gain access to a private computer network and in response to a determination that one or more passwords match the password used by a user, block access to a user account, reject a use of the password by the user, or cause the user to change the password.

Figure 3:
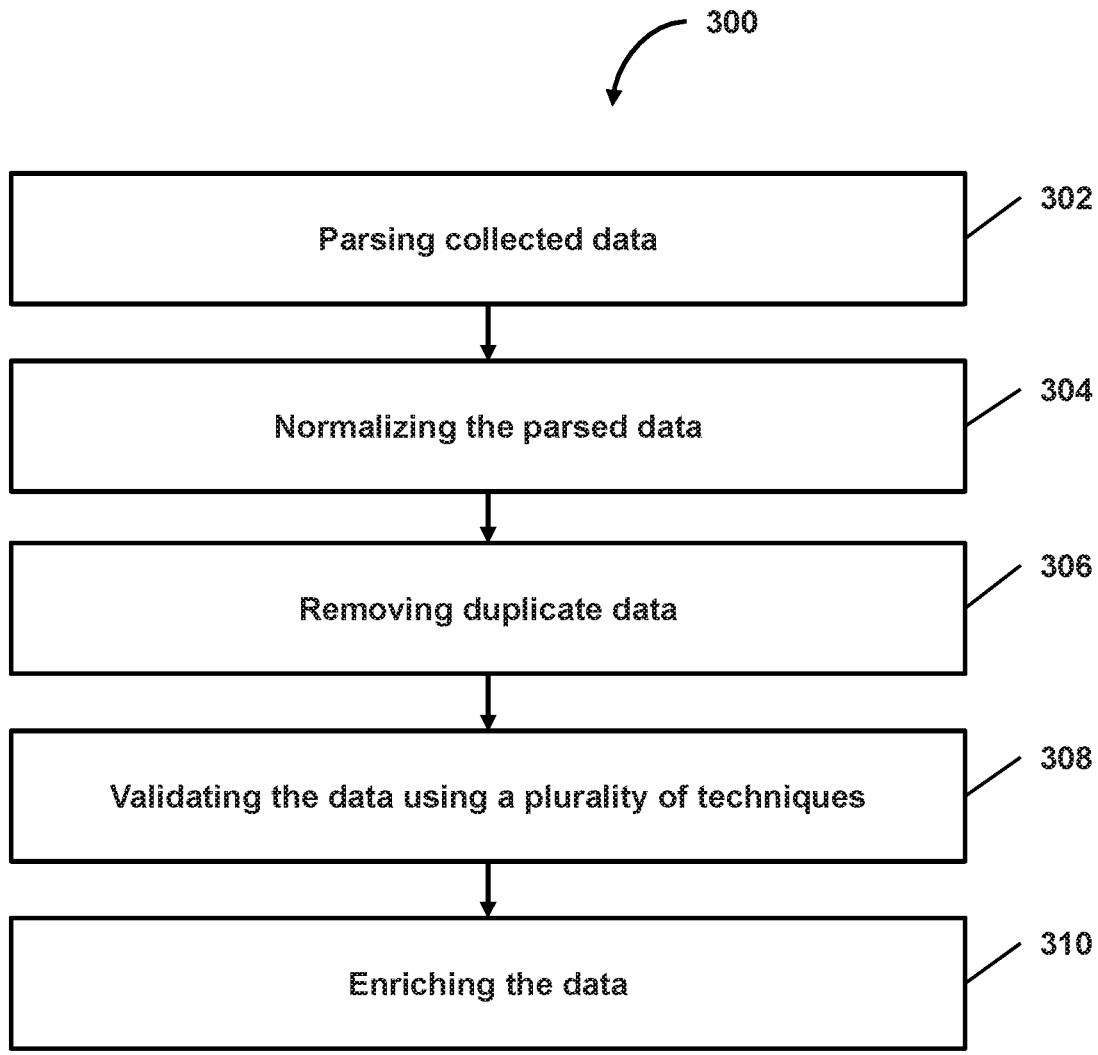
FIG. 3 is a flowchart describing an example of a process of cleansing collected data.

FIG. 3 illustrates an example process 300 of cleansing collected data described in step 204 in FIG. 2. In step 302, in some embodiments, the collected data is parsed and the parsed data is normalized in step 304. During the normalization process, in some embodiments, the data is parsed and classified into different fields (for example, date of birth, user name, password, domain name, etc.). Also, during the normalization process (or during any step illustrated in FIG. 3), data that is not relevant may be deleted. For example, data records that do not include passwords or high value personal identification information may be discarded.

In step 306, duplicate data may be removed. During this step, in some embodiments, the normalized data may be compared to more than one or ten billion assets already stored in the database 132 (for example, the data collection database 134) or local database 142 (for example, the data collection database 144) and data that are duplicates may be discarded. In some cases, the above techniques configured to expedite pairwise matching of sets may be implemented to perform deduplication. Although duplicate data may be discarded, the database 132 or local database 142 may keep a record of a number of duplicates that were retrieved from unique sources.

In step 308, the data may be then validated using a plurality of techniques. Routines such as "validation rules," "validation constraints," or "check routines" may be used to validate the data so as to check for correctness and meaningfulness. The rules may be implemented through the automated facilities of a data dictionary, or by the inclusion of explicit application program validation logic.

Finally, in step 310, the data may be enriched so that the database 132 (for example, the data collection database 134) or local database 142 (for example, the data collection database 144) may be populated with, for example, how many times user credentials have been ingested from a unique source, the severity of each individual record, and additional metadata combined from different sources.

The populated database 132 (for example, the data collection database 134 or repository 238) or the local database 142 (for example, the data collection database 144) may take a number of forms, including in memory or persistent data structures, like ordered or unordered flat files, Indexed Sequential Access Method (ISAM), heap files, hash buckets, or B+ trees. In some embodiments, the data may be relatively frequently (e.g., more than once a week on average) collected, cleansed, and populated.

Generating Fake Data Entries to Determine Potential Breach of Other Data Entries As noted above, exposed or stolen credentials (for example, username/password combinations, credit card numbers, etc.) are a problem across industries. Some of the present techniques afford efficient and proactive ways of generating data entries (for example, fake data entries that are similar to real data entries), determining a potential breach of other data entries (for example, other data entries that are stored in one or more databases that also store the fake data entry) in response to an indication that the fake data entry has been found in a repository of compromised credentials, and notifying one or more users of a potential breach of the other data entries. One advantage of determining a potential breach of data entries by generating fake data entries is that only the fake data entries are compared to data in the repository of compromised credentials (as opposed to comparing all the data entries to the data in the repository of compromised credentials, which is not to suggest that this, or any other approach, is disclaimed or that embodiments are limited to those having this, or any other described advantage). As such, the use of computing and network resources is reduced. FIGS. 1A and 1B illustrate a system that generates data entries (for example, fake data entries) and determining a potential breach of other data entries (for example, other data entries that are stored in one or more databases that also store the fake data entry). In some cases, the fake data entries are difficult for a threat actor to distinguish from legitimate data entries, and in some cases, the fake entries are systematically varied to provide a time-varying, location-varying, or session-varying signal of when breaches have occurred.

In some embodiments, a data entry generator 225 may generate (e.g., select from extant values, compute new values, or a combination thereof) data entries that are similar to data entries in data repositories 223 and 224, e.g., values of a field in records, like a password field, a credit card field, a social-security number field, etc. For example, the data entries may include username/password combinations (both personal and work-related), credit card numbers, gift card numbers, voucher codes, national identification numbers (for example, social security numbers), physical addresses, phone numbers, passport numbers, vehicle registration plate numbers, driver's license numbers, date of birth, birthplace, or any other personally identifiable information that may tie to one or more users. Although only two data repositories 223 and 224 are illustrated in FIG. 1B, it should be understood that there may be more (hundreds, thousands, millions, or billions) data repositories (that may be within the network accessible resource 214 or outside the network accessible resource 214) that store data entries. In some embodiments, data in one repository may be replicated in one or more other repositories. Records may association values of these types of fields with other entries in other fields, e.g., time stamps of transactions, various permutations of the above fields, and the like.

In some embodiments, in order to generate the data entries to be similar to the real data entries, one or more criteria may be used to generate the data entries. For example, generated data entry may be a username and password combination, which may be generated using one or more criteria that is used to generate other username and password combinations. The one or more criteria (the plural form is used generically herein to refer to both the singular, criterion, and the plural, criteria) to generate the username and password combinations may include: (a) generating a password without repetitive or sequential characters, (b) generating a password that does not include dictionary words or context-specific words, (c) generating a password that includes characters greater than a minimum number of characters and less than a maximum number of characters, (d) generating a password that has a greater than a threshold amount of entropy, (e) generating a password that includes an upper case letter, a number, or a special character, and (f) generating a username in a similar format to other usernames, among other examples.

In some embodiments, the data entry generator 225 may generate a password that does not include repetitive characters. For instance, embodiments may randomly (e.g., pseudo-randomly) append characters to a string and generate a candidate password such as "aaa123" or "aaabbb," and embodiments may determine that these candidates include repetitive characters and reject the candidate. Accordingly, the data entry generator 225 may avoid generating a password that includes such repetitive characters. In some embodiments, after selecting each part (e.g., character or sub-field) of a fake data entry, embodiments may cull a set of candidate components (e.g., subsequent characters or sub-field values) to remove those that fail to comply with criterial like those described herein, before randomly or systematically selecting among those candidates that remain. Further, in some embodiments, the data entry generator 225 may generate a password that does not include sequential characters. For instance, a password such as "abc8281" may be determined to include sequential characters (since the first three characters "abc" are sequential characters in the alphabet) and accordingly, the data entry generator 225 may avoid generating a password that includes sequential characters.

In some embodiments, the data entry generator 225 may generate a password that does not include one or more commonly used (e.g., as measured relative to a designated corpus or list) dictionary words. In other words, while generating a password, the data entry generator 225 may avoid using dictionary words in the password. The data entry generator 225 may check a repository (for example, within the network accessible resource 214) of dictionary words in order to generate a password that does not include most commonly used dictionary words. Such a repository of dictionary words may include more than 10,000 entries, 100,000 entries, 1 million entries, 10 million entries, 100 million entries, or 1 billion entries.

In some embodiments, the data entry generator 225 may generate a password that does not include one or more context-specific words. For instance, a password such as "Microsoft123" associated with a Microsoft user account may be determined to be context-specific because the password identifies the company name. Further, a password such as "gmail22" associated with a gmail user account may be determined to be context-specific because the password identifies the email address. Additionally, a password such as "johnsmith" associated with a username john.smith@xxx.com may be determined to be context-specific because the password identifies the username. In order avoid generating a password that includes context-specific words, the data entry generator 225 may retrieve other information associated with the generated password, for example, username, company name, domain name, etc. from a data repository (for example, data repositories 223 or 224) or from information provided by a user, and based on such other information, the data entry generator may avoid generating a password includes context-specific words.

In some embodiments, the data entry generator 225 may generate a password that includes characters equal to or greater than a minimum number of characters and equal to or less than a maximum number of characters. For instance, the minimum number of characters may be 8, 10, 12, or any other number and the maximum number of characters may be 16, 32, 64, or any other number. The minimum number and maximum number of characters may be modified based on security needs.

In some embodiments, a username may be generated based on one or more criteria used for other usernames. For example, if a company generates usernames such as firstname.lastname@companyname.com, then the data entry generator 225 also generates a username in such a format. Alternatively, if a company generates usernames such as firstinitial.lastname@companyname.com, then the data entry generator 225 also generates a username in such a format. In other words, the data entry generator 225 may generate data entries (for example, fake username and password combinations) similar to the format of real username and password combinations stored in the data repositories 223 and 224. In some embodiments, usernames and other fields may be generated that appear non-fake by, for instance, combining existing usernames and introducing high-entropy characters, e.g., "JohnSmith," and "JaneDoe" may be parsed and combined into "JohnDoe98" to generate a realistic username.

In some embodiments, the data entries may be various unique strings (e.g., composed of letters, numbers, or various non-alphanumeric characters). For example, the data entries may be credit card numbers that are generated using one or more criteria for generating real credit card numbers. A credit card number may include one or more digits that identify an issuer (for example, Visa, Master Card, American Express, etc.), one or more digits that identify the account number associated with the credit card, and a check digit (which is determined solely based on the digits that precede it). The check digit may be generated using the Luhn Algorithm. In some cases, the check digit is generated as follows: For example, if the numbers preceding the check digit (which is the last digit in a credit card number) are 7992739871, then the check digit is determined based on the following criteria: (a1) from the rightmost digit, and moving left, double the value of every second digit (starting with the right most digit); (a2) If any of these doubled values is more than 9, then add the digits; (b) add all the digits from steps (a1) and (a2); and (c) the check digit is chosen so that the sum of the check digit and added value found in step (b) is a divisible of 10. A table below illustrates an example for determining the value of the check digit. X in the table below denotes the check digit.

| Account # | 7 | 9 | 9 | 2 | 7 | 3 | 9 | 8 | 7 | 1 | x |
|---|---|---|---|---|---|---|---|---|---|---|---|
| Step a1 | 7 | 18 | 9 | 4 | 7 | 6 | 9 | 16 | 7 | 2 | x |
| Step a2 | 7 | 9 | 9 | 4 | 7 | 6 | 9 | 7 | 7 | 2 | x |

As illustrated above in the table, in step a1, every other digit is doubled (starting from the right most digit next to the check digit, and moving left) and in step a2, if any of these doubled values is more than 9, then those digits are added (for example 16 in step a1 becomes 7 in step a2, and 18 in step a1 becomes 9 in step a2). The sum of all the digits from steps a1 and a2 is 67 (i.e., the bottom row in the table above totals 67). Accordingly, in view of step c, the check digit is chosen to be 3 because the sum of the check digit (3) and 67 is divisible by 10 (i.e., 70 is divisible by 10). Accordingly, the data entry generator 225 may use the above-described criteria to generate a credit card number.

In some embodiments, the fake data entries are generated similar to the real data entries because hackers that are sophisticated would easily write a script to recognize a fake data entry as being fake and filter the fake entry from a dump before posting. Accordingly, in order to be able to determine potential data breaches based on the present techniques, some embodiments generate the fake data entries similar to the criteria used for generating the real data entries so that the fake data entries look real to hackers attempting to breach databases.

In some embodiments, before storing the generated data entry in one or more repositories in the network accessible resource 214, the data entry generator 225 (or the controller 222) may determine whether the generated data entry already exists in the data repositories 223 and 224 or in the compromised credential repository 238 using the comparison techniques described above, e.g., with a content addressable data structure (like a hash table, sorted list, prefix trie, etc.), with a probabilistic data structure like a Bloom filter or Cuckoo filter, or with a brute force search. When it is determined that the generated data entry does not exist in the data repositories 223 and 224 or in the compromised credential repository 238, the controller 222 may store the newly generated data entry in the data repository 223 or 224. Such checks may be made in order to make sure that the fake data entry does not match an already existing real data entry.

In some embodiments, the data entry generator 225 may embed additional information in the generated data entry (for example, username/password combination, credit card numbers, etc.). Such information may include time (for example, date, month, year, etc.) of generation of the data entry. For example, a password starting with 'A18' may indicate that the password was generated in January 2018. Additionally, for example, a credit card number having digits '118' may indicate that the credit card number was generated in January 2018. Although the above examples are provided, it should be understood that the data entry generator 225 may use any other scheme in order to embed time information into the generated data entry, e.g., part of the entry may be a hash function output based on such supplemental information. Embedding time information is expected to be useful because if the data entry is determined to be found in the compromised credential repository 238, the data entry generator 225 (or any other component of network accessible resource 214) may quickly identify the time at which other data entries (for example, other data entries that are stored in the same database as the data entry found in the compromised credential repository 238) may have been breached. Additionally, or alternatively, the network accessible resource 214 may store, in a repository, a date of generation of each data entry so that when the data entry is found in the compromised credential repository 238, the network accessible resource 214 may access this repository to determine a time associated with the generation of the data entry.

An advantage of embedding time into the data entry or separately storing timing information associated with the generation of the data entry is that such records may be interrogated to infer a time around which other data entries (and associated online resource) in one or more databases may have been breached. For example, if data entry A is added to database 1 at 7:30 pm on Jan. 1, 2018, data entry B is added to database 1 at 9:30 pm on Jan. 1, 2018 (and at the same time or immediately subsequent to the addition of data entry B, data entry A is deleted from database 1), and if data entry B is the only data entry found in the compromised credential repository at 10 pm, it may be reasonable to conclude that other data entries (or online resource(s) associated with the other data entries) in database 1 that were present in database 1 on or after 9:30 pm may be potentially breached/compromised. That said, embodiments are not limited to systems that afford this advantage, which is not to suggest that any other described advantage is exhibited by all embodiments.

In some embodiments, the data entry may be periodically (or otherwise systematically varied over time, e.g., aperiodically) changed (for example, every minute, hour, day, month, year, or in response to an event, like a threshold number of new records being written to a database etc.) such that a new fictitious data entry is added to a repository (for example, within the network accessible resource 214) and subsequently the previous data entry may be deleted from the repository. Such change of the generated data entry may result in signals that embodiments analyze to identify other data entries that might have been breached. For example, if data entry A is added to database 1 at 7:30 pm on Jan. 1, 2018, data entry B is added to database 1 at 9:30 pm on Jan. 1, 2018 (and subsequently data entry A is deleted from database 1), and data entry C is added to database 1 at 11:30 pm on Jan. 1, 2018 (and subsequently data entry B is deleted from database 1), and if data entry B is the only data entry found in the compromised credential repository at 11:45 pm, embodiments may determine, in response, that other data entries (or online resources associated with the other data entries) that were present in database 1 between 7:30 pm and 11:30 pm on Jan. 1, 2018 may have been potentially exposed or otherwise breached. Thus, embedding the time into the generated data entry or storing information regarding the time at which the data entry was generated may provide a signal that embodiments respond to by narrowing the list of other data entries (or online resources associated with the other data entries) that may have been exposed or otherwise breached.

In some embodiments, the generated data entry may be associated with a flag to indicate the location of storage of the generated data entry. For example, when the data entry generator 225 generates a new data entry and stores the newly generated data entry in a first repository, a flag value of '1' may be generated and stored along with the newly generated data entry. Further, when the newly generated data entry is replicated and stored in a second repository, a flag value of '2' may be generated and stored along with the replicated data entry in the second repository. This way, the location of the identical data stored in the first repository and the second repository may be distinguished using the flag value. In some embodiments, if the newly generated data entry is found in the compromised credential repository 238, it may be determined whether a flag is also found along with the data entry in the compromised credential repository 238. This flag may help determine which database (and other data entries and associated online resource(s)) has been breached/compromised. In some embodiments, when data is replicated in another repository, e.g., in response to receiving an event indicating such replication from a database management system, the data entry generator 225 may generate a unique (e.g., relative to breached values, fictitious values, and non-fictitious non-breached values) data entry to be added to the other repository. This way, even if the data entries stored in one repository are replicated in another repository, the other repository may include a newly generated data entry that is unique and not stored in the previous repository. For example, if data entry A is generated and stored in database 1 at 7:30 pm on Jan. 1, 2018, if data entry A is replicated and stored in database 2 at 9:30 pm on Jan. 1, 2018, if data entry B is generated and stored in database 2 at 9:30 pm, and if only data entry A is found in the repository of compromised credential data at 10 pm on Jan. 1, 2018, then, in response, embodiments may determine that only database 1 has been breached (and not database 2) because data entry B was not found in the repository of compromised credential data.

In some embodiments, the data entry generator 225 may generate a database entry in the form of a document (for example, Word™, pdf, Excel™, text file, etc.), like an email, or a database entry in the form of content to be inserted into a document, like a hyperlink, tracking code, etc. that includes a tracking pixel (or other call to a remote resource to be embedded in a document upon rendering). A tracking pixel may be a 1×1 pixel (or larger) or a pixel tag that is loaded when a document or an email is opened or when a hyperlink is accessed. Or embodiments may use a tracking font, a tracking script, or various other remote resources called when rendering by a rendering engine. The tracking pixel may be associated with a URL that corresponds to a memory location on a server. When a document, email, or hyperlink that has a tracking pixel is opened, the opening application may parse the document, detect the URL, and respond by triggering a request to a web server where the tracking pixel is hosted. The server may then send a pixel tag to an IP address (from which the document, email, or hyperlink was opened or accessed) and that IP address may be logged by the web server. In addition to the IP address, various other information of, for example, a user that opened or otherwise accessed the document, email, or hyperlink may be obtained. Such other information may include an operating system used, types of web site or email used, type of client used, screen resolution, time the document (or email or hyperlink) was read or otherwise accessed, and activities on the website during the session. When a web server (not shown in FIG. 1B, but may be implemented within the network accessible resource 214 or external to the network accessible resource 214) receives a notification that document, email, or hyperlink has been opened or otherwise accessed, the web server may notify the network accessible resource 214 (for example, controller 222) and it may be determined that other data entries (for example, that are stored in the same database as the document, email, or hyperlink) may have been potentially breached/compromised.

In some embodiments, the data entry generator 225 may be a machine learning model (for example, a generative model as part of a generative adversarial network in which the generative model and a discriminative model "compete" with one another in a zero-sum game framework) that generate data entries. In some use cases, the generative model generates candidates from latent vectors, and the discriminative model evaluates the candidates, where the generative model learns to map from a latent space to a particular data distribution of interest, and where the discriminative network discriminates between instances from the data distribution and candidates produced by the generative model. The generative model may be configured with the training goal of increasing the error rate of the discriminative model (e.g., "trick" the discriminative model into guessing that the generated candidates are instances from the data distribution), while the discriminative model may be configured with the training goal of decreasing its error rate.

In some embodiments, a known data set may be provided as the initial training data for the discriminative model, and the discriminative model may be trained with the training data set until the discriminative model reaches a threshold accuracy level. For example, a neural network classifier may be trained to classify inputs as fake or not fake by augmenting the training set with random values labeled as fake and labeling the other values as non-fake. The model may then be essentially run in reverse to output legitimate appearing fakes. The generative model may be seeded with a randomized input sampled from a predefined latent space, and samples produced by the generative model are then evaluated by the discriminative model. Backpropagation may be applied in both models so that (i) the generative model produces data items that more closely resemble the training data set (e.g., username/password combinations, credit card numbers, etc.) and (ii) the discriminative model becomes better at identifying "fake" reproductions from the actual data items in the training data. In some use cases, the generative model may be a deconvolutional neural network, and the discriminative model may be a convolutional neural network. Or both may be recurrent neural networks, like long-short term memory models.

In some embodiments, once the data entry is generated by the data entry generator 225, the data entry may be compared to compromised data stored in the compromised credential repository 238 to determine whether the compromised credential repository 238 includes the data entry. In some embodiments, the network accessible resource 214 (for example, the controller 222) may generate a query and send the query, via the network 218, to the credential-monitoring system 212. The query may identify the data entry and may include a request to determine whether the compromised credential repository 238 includes the data entry. In some embodiments, the query may identify a plurality of data entries that have been generated by the data entry generator 225 and may include a request to determine whether the compromised credential repository 238 includes the plurality of data entries.

In some embodiments, the credential-monitoring system 212 may run a periodical batch process (for example, every 10 mins, every hour, every few hours, every day, etc.) or aperiodic batch process (for instance, responsive to events like a threshold number of entries being added) in which a set of data entries are compared to the data entries of the compromised credential repository 238. In some embodiments, the credential-monitoring system 212 may run a batch process at a scheduled time in order to compare the data entry with a set of data entries stored in the compromised credential repository 238. Alternatively, or additionally, the credential-monitoring system 212 compare the obtained data entry to the data entries in the compromised credential repository 238 in response to receiving the query.

In some cases, as noted above, the comparison between the data entry and the set of data entries in the compromised credential repository 238 may be performed remotely by, for example, the credential-monitoring system 212. As noted above, the data entry may be transmitted from, for example, the network accessible resource 214 to the credential-monitoring system 212 in the form of a cryptographic hash of that data entry for comparison with cryptographic hashes of data entries in the compromised credential repository 238 using the same cryptographic hash function and salt, like SHA 256 or MD5 hashes, so that comparisons are performed without having access to the data entries outside the network accessible resource 214. The match between the data entry and the set of data entries in the compromised credential repository 238 may be determined based on a cryptographic hash collision.

In some cases, in response to receiving the data entry (or data entries), the credential-monitoring system 212 may compare (for example, at a scheduled time or as soon as the credential data is received) the received data entry and the set of data entries stored in the compromised credential repository 238 to obtain compromised data entries that matches the received data entry. For instance, the data entry obtained from the network accessible resource may include one or more username/password combinations, and the credential-monitoring system 212 may compare (for example, by querying the compromised credential repository 238. The query may be an SQL (Structured Query Language), an MDX (Multidimensional Expressions) query, or the like) the received username/password combinations with the compromised credential data of the compromised credential repository 238 to check whether the one or more username/password combinations match one or more compromised username/password combinations stored in the compromised credential repository 238. In other words, the credential-monitoring system 212 may perform a comparison of a first set of credential data (for example, the one or more username/password combinations obtained from the network accessible resource 214) and a second set of data (for example, the one or more compromised username/password combinations stored in the compromised credential repository 238). Although the compromised credential repository 238 is illustrated to be located in the credential-monitoring system 212, it should be understood that the compromised credential repository 238 may also be located within the network accessible resource 214. Accordingly, in some embodiments, the comparisons between the generated data entry and the compromised data may be performed within the network accessible resource 214.

In some embodiments, the number of compromised credentials in the compromised credential repository 238 and the number of username/password combinations obtained from the network accessible resource 214 may be relatively large, for instance, greater than 1,000, greater than 10,000, greater than 100,000, greater than 1 million, greater than 10 million, or greater than 100 million distinct entries corresponding to different distinct sets of credentials. Accordingly, as noted above, performing a comparison between two sets of data may be a relatively computationally expensive operation, particularly when the comparisons are time sensitive operations to detect potential breaches. In order to address this challenge, various data structures may be implemented to expedite the operation, comparisons may be expedited through concurrent operations, or comparisons may be performed sequentially for different parts of a set of credentials, e.g., with techniques like those described above.

In some embodiments, the credential-monitoring system 212 may determine one or more criteria for comparing the data entry and the compromised credential data to make the search process more efficient than more naïve approaches. In some embodiments, one or more criteria for the comparison may be generated by the credential-monitoring system 212 based on various factors. For example, a criterion for the comparison (e.g., a value of a field in a where clause) may be determined based on whether another comparison identifying the same data entry has been previously made. In some embodiments, the credential-monitoring system 212 may determine whether the data entry (that is currently identified in a comparison) has also been identified in one or more previous comparisons. When a credential-monitoring system 212 compares the data entry and the compromised credential data, in response, a record (for example, metadata related to the comparison) may be stored to document a comparison in a repository. Such a record may include a date and time of the comparison, a location (for example, IP address) from where the request for comparison is received, data entry identified in the comparison, or various other data related to the obtained data entry.

In some embodiments, for instance, the credential-monitoring system 212 may retrieve a previous date and time (which includes values indicative thereof at various resolutions, e.g., a month, a quarter, a week, or a timestamp at the nanosecond level from some epoch) the obtained data entry was identified in a previous comparison, and use this date and time to generate a search criterion for the comparison. In response to determining that the data entry has been previously identified in another comparison, the current comparison of the data entry and the compromised credential data in the compromised credential repository 238 may be limited to, for example, data that has been populated (for example, populated into the compromised credential repository 238) on or after the date (or time) the data entry was previously identified in the other comparison. In some embodiments, when (e.g., in response to an event in which) the credential-monitoring system 212 determines that another comparison identifying the same data entry (which is identified in the current comparison) has been previously obtained, the credential-monitoring system 212 may generate a search criterion for the comparison such that data (related to the data entry) that is retrieved from the compromised credential repository 238 corresponds to data that was populated into the compromised credential repository 238 on or after a date or time of the previous comparison.

In some embodiments, once the comparison and the search criterion are requested and generated, compromised credential data that match the data entry identified in the comparison is retrieved from the compromised credential repository 238 based on the comparison and the criterion for the comparison. In some embodiments, when (e.g., in response to an event in which) it is determined that the data entry has not been previously identified in a previous comparison, the search criterion may cause embodiments to require the entire compromised credential repository 238 to be searched in order to retrieve compromised credential data (for example, one or more username/password combinations) that matches the data entry identified in the current comparison. On the other hand, when (e.g., in response to an event in which) it is determined that the data entry has been previously identified in a previous comparison, the search criterion may cause embodiments to require only a portion of the compromised credential repository 238 (the portion that includes data populated on or after the date or time the previous comparison was performed) to be searched in order to retrieve compromised credential data (for example, one or more username/password combinations) that matches the data entry identified in the current comparison. In some embodiments, the compromised credential repository 238 may be indexed in such a manner that compromised credential data populated in the compromised credential repository 238 at different times can be easily distinguished during a search process.

The above descriptions make the data retrieval process more efficient relative to simpler data access techniques, which is not to suggest that embodiments are limited to systems that afford this benefit. Allowing the search to be performed on only a portion (or subset) of the compromised credential repository 238 is expected to decrease the time taken to retrieve compromised credential data that match the data entry, reduce the use of computer resources of, for example, the credential-monitoring system 212, and provide the retrieved compromised credential data to a recipient sooner (e.g., within less than 1 second, 500 milliseconds, or 200 milliseconds) so that the recipient may act on the such data in a quicker manner, thereby potentially preventing account takeover sooner. In some embodiments, the entire compromised credential repository 238 may not need be searched and only a portion (or subset) of the compromised credential repository 238 may need to be searched to retrieve compromised credential data that match data entry, none of which is to suggest that simpler data access techniques or any other subject matter are disclaimed.

In some embodiments, the compromised credential data (for example, one or more username/password combinations) retrieved from the compromised credential repository 238 may include metadata associated with the one or more username/password combinations retrieved from the compromised credential repository 238. Such metadata may include a date of exposure of the one or more username/password combinations, a number of exposures of the one or more username/password combinations, or a location of exposure of the one or more username/password combinations. The date and time of exposure of the one or more username/password combinations may correspond to the date and time at which the one or more username/password combinations was collected during the collection of data using a plurality of data collection techniques from a plurality of sources in step 202 of FIG. 2. During the step of collecting data in step 202 of FIG. 2, the collected data may be correlated with a date and time of collection of the data. In some embodiments, the date and time of exposure of the one or more username/password combinations may correspond to the date and time at which the one or more username/password combinations was exposed within the source.

In some embodiments, the retrieved metadata may include a number of exposures of the one or more username/password combinations. For example, the same password may be exposed within a plurality of sources. Accordingly, a count or other metric may be stored in the compromised credential repository 238 regarding a number of exposures of the same password. In some embodiments, the compromised credential repository 238 may keep a record of a number of sources from which the same password was collected during the data collection and data cleansing steps illustrated in FIGS. 2 and 3. Further, in some embodiments, the retrieved metadata may include a location of exposure of the one or more username/password combinations. During the data collection step 202, a record may be kept of the location from which the data is collected. For example, a username/password combination may have been exposed on the dark web or a blog post, and such information regarding the location of the exposure may be collected during the data collection step 202 in FIG. 2 and may be retrieved in response to a query identifying the credential data. Such retrieved metadata may be sent to the network accessible resource 214.

Based on a comparison of the data entry or a first set of data entries (for example, one or more username/password combinations obtained from the network accessible resource 214) and a second set of compromised credential data (for example, one or more data entries in the compromised credential repository 238), the credential-monitoring system 212 may determine that there is a match between the data entry (or first set of data entries) and second set of data. The credential-monitoring system 212 may retrieve one or more compromised credential data (for example, one or more username/password combinations from the compromised credential repository 238) that match the data entry (for example, one or more username/password combinations obtained from the network accessible resource 214).

In some embodiments, once the comparisons are made, query results may be sent to the network accessible resource 214. In some embodiments, in response to the query (which included the data entry and a request to determine whether the compromised credential repository 238 includes the data entry), the credential-monitoring system 212 may send the results of the query to the network accessible resource 214. The query results may include the compromised data that matches the data entry and may include an indication that compromised credential repository 238 includes the data entry. In some embodiments, if there is no match between the data entry and the compromised data in the compromised credential repository 238, then in response, the query results may indicate that there is no match. The term "query" is used broadly and may include API calls between systems, queries via a DBMS, or function calls between modules in a monolithic application.

In some embodiments, in response to receiving the query results, the network accessible resource 214 (for example, controller 222) may identify one or more repositories (for example, one or more data repositories 223/224) that include the data entry that was indicated as being included in the compromised credential repository 238. Based on the data entry being found in the compromised credential repository 238, some embodiments may infer that other data entries that are stored in the one or more repositories in which the data entry is stored may also have been potentially comprised or otherwise breached. In some embodiments, other data entries from the same repository in which the data entry (which was found to be included in the compromised credential repository 238) is stored may also have been potentially exposed or otherwise breached. Although a data entry (which was found to be included in the compromised credential repository 238) may be stored in a plurality of repositories, some embodiments may narrow the search for a breached repository determining that there are different generated data entries in each of the repositories and logging which fake entry is stored in which repository. For example, in response to determining that the data entries of a repository are replicated into another repository, some embodiments may generate another data entry (for example, at the time of replication, in response to an event emitted by a DBMS that causes a registered callback function to be executed or an overridden function to be called) to be stored in the new repository. Some embodiments may thereby increase the likelihood that different repositories have different data entries that are generated and therefore, that it is possible to identify a repository (and data entries in that repository) that has been breached. For Example, let's assume that data entry 1 is generated and stored in data repository 223 at 7:30 pm on Jan. 1, 2018 and data entry 1 is replicated and stored in data repository 224 at 11:30 pm on Jan. 1, 2018 (and at the same time, data entry 2 (which is distinct from data entry 1) is also generated and stored in repository 224). If data entry 1 is found in the compromised credential repository 238 at Sam on Jan. 2, 2018 and data entry 2 is not found in the compromised credential repository 238 at Sam on Jan. 2, 2018, data repository 223 will be identified as the compromised repository and repository 224 will not be identified as a compromised repository. Now, if both data entry 1 and data entry 2 were found in the compromised credential repository 238 at Sam on Jan. 2, 2018, then data repository 223 and data repository 224 are identified as potentially compromised/breached. To further narrow the list of potentially breached repositories, data entry 3 may be generated and stored at repository 223 at the same time data entry 1 is generated and stored in repository 223. In some use cases, if both data entry 1 and data entry 2 were found in the compromised credential repository 238 at Sam on Jan. 2, 2018 (and data entry 3 is not found in the compromised credential repository 238 at 8 am on Jan. 2, 2018), then repository 224 is identified by some embodiments as a compromised/breached repository and repository 223 is not identified as compromised/breached repository. Accordingly, by identifying the breached repository, other data entries in that repository may be identified.

In some embodiments, a time of breach of one or more repositories may also be identified. Periodically changing the generated data entry may help identify the time of breach of one or more repositories. For example, if data entry 1 is added to data repository 223 at 7:30 am on Jan. 1, 2018, data entry 2 is added to data repository 223 at 9:30 am on Jan. 1, 2018 (and at the same time or immediately subsequent to the addition of data entry 2, data entry 1 is deleted from repository 223), and only data entry 1 was found in the compromised credential repository 238 at 11 am in Jan. 1, 2018, the time of the breach of repository 223 may be identified as being before 9:30 am on Jan. 1, 2018. In another example, if data entry 1 is added to repository 223 at 7:30 am on Jan. 1, 2018, data entry 2 is added to repository 223 at 9:30 am on Jan. 1, 2018 (and at the same time or immediately subsequent to the addition of data entry 2, data entry 1 is deleted from repository 223), data entry 3 is added to repository 223 at 11:30 am on Jan. 1, 2018 (and at the same time or immediately subsequent to the addition of data entry 3, data entry 2 is deleted from repository 223), and only data entry 2 is found in the compromised credential repository at noon on Jan. 1, 2018, then the time of breach of repository 223 will be identified as being between 9:30 am and 11:30 am on Jan. 1, 2018. Accordingly, other data entries that were stored in repository 223 between 9:30 am and 11:30 am on Jan. 1, 2018 may also be identified as being potentially breached.

In some embodiments, as noted above, network accessible resource 214 may identify which database or other repository has been breached and a time of such breach. Based on identifying the respiratory that has been breached and the time of breach of such a respiratory, the controller 222 may identify other data entries that may have been breached. For example, by identifying a repository that has been breached, other data entries that are stored in the repository may also be identified as being breached and by identifying a time (or a time window) of breach of a repository, other data entries that were stored in the repository during the identified time (or time window) may also be identified as being breached. An advantage of identifying a breached repository and a time at which the breach occurred will help an administrator of the network accessible resource 214 to quickly identify the amount of breach and allow the administrator to take preventive measures to prevent additional breaches, which is not to suggest that embodiments are limited to systems that afford this advantage or any other advantage described herein or that any other description is limiting.

Some embodiments may associate different, unique fake entries with other aspects of a repository that might later be correlated with a breach. For instance, some embodiments may inject a unique fake entry in each query response, log an association therebetween, and later associate a breach including the unique fake entry with the query or a user account used to authenticate a session including the query (which may take the form of an access request to a file system or access request for an email). Some embodiments may do the same for different shards of a database, different backups of a database, different geographic regions in which data is stored, or different instances in which an encrypted record is decrypted from ciphertext to plaintext. Thus, various clues about the who, what, when, where, and how of a breach may be inferred from which fake entries are included and values associated with those fake entries in a log of the insertions. In some embodiments, other records to which these attributes of a breach pertain may be selected (or otherwise identified) and designated in memory as potentially subject to the breach.

In some embodiments, once the other data entries that may have been breached have been identified, the controller 222 may identify users (e.g., pseudonymous identifiers thereof, like usernames) associated with the other data entries. For example, if the other data entries are username/password combinations for accessing an online resource, the controller 222 may identify the users associated with the username/password combinations. In some embodiments, a user may be informed that his/her username/password combination has been breached (or likely been breached) and that the user should immediately change his/her password to avoid further breaches. Further, the user may be blocked from accessing his/her account associated with the username/password combination until the user changes his/her password. In another example, the other data entries may be credit card numbers. In such a case, a user associated with the credit card number may be identified and informed (e.g., by sending a message to an address associated with the user, like to an email address, to a phone number, or a mailing address, or by inserting an alert in a user interface of an application by which the user seeks to access online resources with the credentials) of a breach (or a likely breach) of his/her credit card information. The user also may be informed that a new credit card number and credit card will be sent to the user shortly and that the user will be unable to use his/her current credit card.

In some embodiments, the network accessible resource 214 (for example, controller 222) may determine whether the identified users are active users. For example, if the other data entries are username/password combinations for accessing an online resource, the controller 222 may determine whether the users are active users of accounts associated with the username/password combinations. Active users may be identified based on a previous time stamp of access of the user account. In other words, a user account may be identified as an active user account when a time difference between the previous time stamp and a current time is less than a threshold (e.g., a predetermined threshold or a dynamically determined threshold). In response to determining that one or more user accounts are inactive user accounts, the controller 222 may not inform such users of breached data entries and only the users associated with active user accounts may be informed of the breached data entries.

Data entries may be entries in records. Records may have a plurality of fields taking values in each record encoded by the data entry. A repository may associate the data entries in a record with one another (e.g., in a user profile). A repository may store a plurality of records adhering to a schema that specifies the fields in records and syntax, rules, formats, types and other criteria that define a valid entry. In some cases, entire records may be fictitious, of portions thereof. In some cases, fictitious records may include fields with values that are not, in isolation, unique to the repository, but associations in the record may be fictitious forms of data entries, e.g., a repository may have a "John Smith" and a different person with the password "1234pw!," but a fictitious record (which is a type of fictitious data entry) may include a unique association therebetween, indicating in the fake record that "John Smith" has the password "1234pw!" (or password with a hash thereof). Such fake associations may also be detected in breaches with the techniques above consistent with the terminology above.

Measuring Data-Breach Propensity

In some scenarios, an entity (for example, a person, a group of people, an organization, etc.) may want to know the cybersecurity risk of conducting business with another entity. For example, an entity (e.g., its principals) may be worried about the security of confidential information that it shares with another entity and may want to obtain a rating or other score of the other entity quantifying the risk. Entities may (in some cases algorithmically via embodiments) apply a threshold to determine whether confidential information is shared based on such a score to reduce the risk of breaches via the recipient entity. The score is referred to as an "identity score." Computing an identity score associated with an entity may help another entity know the risk of conducting business with the entity. This identity score may provide an indication as to a potential risk of exposure of data associated with the entity. Identity scores may aggregate (e.g., in a single value or collection of values mapped to various facets of security) empirical information about a collection of individuals associated with that entity. For example, an entity may have a secure and robust cybersecurity system in place and this may result in computation of a high identity score. On the other hand, another entity may not have a secure and robust cybersecurity system in place and thus will have a low identity score. These identity scores associated with a first entity may help determine whether it is worth the risk for a second entity to conduct business with the first entity. As an example, a company may wish to hire a law firm to handle its legal work (including highly confidential information) and may determine identity scores for each of the plurality of law firms prior to making a business decision to choose a law firm to work with. In some embodiments, a company may want to know how much of their data has been exposed and computing an identity score may provide the company with an indication of the robustness of their network security systems and security practices of employees (e.g., resistance to phishing attacks and password re-use across systems). Accordingly, a company may be made aware of its own shortcomings and may use the identity score to improve its network security systems and practices.

In some embodiments, a set of credential data of one or more users associated with an entity may be obtained. The set of credential data may include username/password combinations of users associated with the entity, personal (e.g., for accounts not associated with the entity, like a personal email address) username/password combinations, national identification numbers (for example, social security numbers), addresses, phone numbers, passport numbers, vehicle registration plate numbers, driver's license numbers, credit card numbers, date of births, and birthplaces. The set of credential data may be compared to compromised credential data (for example, compromised credential data in compromised credential repository 238 or compromised credential data may be available and stored in a repository in the network accessible resource 214), and embodiments determine if (and quantify an amount of instances in which) the credential data associated with the one or more users has been compromised. The credential data corresponding to a plurality of users may be obtained from data repositories 223 and 224.

In some embodiments, the credential monitoring system 212 may be queried, e.g., with the credentials, which may be done by first computing cryptographic hash values based thereon and sending the hash values to avoid sending credentials in plaintext outside of a trusted network or application. The query may request compromised credentials matching the credential data (for example, usernames of a plurality of users associated with an entity). In response to the query, the network accessible resource 214 may receive query results including one or more password associated with the credential data. In some embodiments, the credential monitoring system 212 may compare the obtained usernames (for example, identified in a query) to the compromised data in the compromised credential repository 238 to retrieve one or more compromised passwords associated with the usernames. Details regarding the comparison of credential data with compromised credential data in the compromised credential repository 238 have been explained in detail above and for the sake of brevity, are not repeated. The various techniques described above to expedite operations at scale may be employed.

Based on the comparisons performed, the network accessible resource 214 may receive query results in response to the query. The query results may include, for example, one or more passwords associated with the credential data (for example, one or more usernames) or a metric, like a count of matches, a rate of matches, or a category of match amounts (like, high, medium, or low). In some embodiments, the network accessible resource (for example, controller 222) may determine whether the one or more passwords received in the query results match the one or more passwords associated with the one or more usernames (which are associated with the entity). In some embodiments, an identity score associated with the entity is computed by an identity score generator 227 based on the query results. In some embodiments, the identity score is dependent on whether the one or more passwords in the query results matches the one or more passwords associated with usernames (which are associated with an entity). Although the identity score generator 227 is illustrated to be within network accessible resource 214, it should be understood that the identity score generator 227 may, additionally or alternatively, be within the credential-monitoring system 212.

In some embodiments, the value of the identity score of an entity may be computed based on whether one or more of the credential data associated with a user associated with the entity is found in the compromised credential repository 238. The following paragraphs will discuss the details of example implementations of computing an identity score associated with an entity.

In some embodiments, based on the comparison results provided from the credential monitoring system 212, the network accessible resource 214 may identify the credential data of one or more users associated with the entity that have been breached. Or some embodiments may determine a metric without identifying who was breached, which is not to suggest that any other feature is not also amenable to variation. For example, based on received comparison results, the network accessible resource 214 may determine whether one or more username and password combinations of one or more users associated with the entity have been found to be exposed/breached. In some embodiments, if there is at least one breach of a username and password combination, the network accessible resource 214 (for example, controller 222) may determine a number (or other metric like those above) of breached password and username combinations associated with the entity. Using such a metric, the network accessible resource 214 may determine a ratio of the number of the breached password and username combinations associated with the entity and a number of total password and username combinations associated with an entity.

For example, a first entity may have 200 employees and this entity may have 20 username and password combinations breached. Accordingly, the network accessible resource 214 may determine the ratio to be 10% (20/200=0.1) for this entity. On the other hand, a second entity may only have 2 breached username and password combinations, but that entity may only have 4 employees. In such a case, the ratio of this second entity will be 50% (2/4=0.5). Although the second entity has a lower number of breached username and password combinations than the first entity, the identity score of the second entity will be more negatively affected than the identity score of the first entity. It should be noted that username and password combinations of active user accounts may be initially obtained for comparison to the compromised credential data in the compromised credential repository 238. Details of determining active user accounts have been discussed above, and for the sake of brevity are not repeated.

In some embodiments, the query results may include metadata associated with the one or more passwords that were found to be associated with the username identified in the query. This metadata may include a date and time the one or more passwords was breached. For example, compromised credential repository 238 may store metadata associated with the compromised data. This metadata may include a date of exposure of the compromised data (for example, one or more passwords), a number of exposures of the credential data (for example, one or more passwords), or a location of exposure of the credential data (for example, one or more passwords). Accordingly, a date of exposure of a username and password combination may be obtained, and embodiments may use such metadata to determine the value of the identity score. For example, the value of the identity score may be dependent on the date and time of breach of the one or more passwords identified in the query results that match the password associated with the entity. For instance, breach instances may be age weighted before being summed to down-weight those that are older, e.g., with a half life, or some embodiments may filter out those older than a threshold age. For instance, in a sum, a breached password one year old may count as 0.5, while one two years old may count as 0.25, while one breached last week may count as 1.

In some cases, identity scores may be based on, or include a distinct value indicative, of knowledge factor credential entropy. In some embodiments, the query results may include additional metadata associated with the one or more passwords that were found to be associated with the username identified in the query. The metadata may include an indication whether any of the one or more passwords in the query results is included in a list of (for example, 100, 1000, 10000, 100000, 1 million, etc.) most commonly breached passwords. Such an indication may have an effect on the identity score of the entity. In other words, the value of the identity score may be dependent on the whether any of the one or more passwords that match the password associated with the entity is included in such a list. Finding breached passwords in such a list may indicate that the entity does not have robust criteria for its users to create strong passwords. A number of passwords that are in the list may be determined and a ratio may be calculated based on the number of passwords on the list and a total number passwords associated with the entity. For example, an entity may have 200 users and 10 of those users may use a password that is found in the list of most commonly compromised passwords. As such, a ratio will be determined to be 5% (i.e., 10/200=0.05) and the value of the identity score will be computed based on such a ratio. The value of the identity score is inversely proportional to this ratio. That is, if the ratio is high, the identity score will be low and if the ratio is low, the identity score will be high. Again, results may be age weighted with techniques like those described above, e.g., a low-entropy password may count less when it is older.

In some embodiments, the quality of the password may be used to compute the identity score of the entity. In other words, the passwords of users associated with an entity may be compared with a plurality of password criteria and the value of the identity score may be computed based on whether the password satisfy these criteria. In some embodiments, the plurality of criteria may include: (a) determining whether a password includes repetitive or sequential characters, (b) determining whether a password includes dictionary words, (c) determining whether a password includes context-specific words, (d) determining whether a password includes characters less than a minimum number of characters or greater than a maximum number of characters, (e) determining whether a password does not include uppercase and special characters, or (i.e., and/or) (f) determining whether the password has greater than a threshold amount of entropy.

In some embodiments, credential guardian 220 may determine whether a password associated with an entity includes repetitive characters. A criterion may be satisfied in response to the determination that the password includes repetitive characters. For instance, a password such as "aaa123" or "aaabbb" may be determined to include repetitive characters and accordingly, the credential guardian 220 may determine that the criterion for repetitive characters is satisfied with such passwords. Some embodiments may measure repetition by determining a difference in size of a run-length coding compressed version of a password and an uncompressed version to detect patterned repetitions, e.g., "ababab." Further, in some embodiments, credential guardian 220 may determine whether a password include sequential characters. A criterion may be satisfied in response to the determination that the password includes sequential characters. For instance, a password such as "abc8281" may be determined to include sequential characters (since the first three characters "abc" are sequential characters in the alphabet) and accordingly, the credential guardian 220 may determine that the criterion for sequential characters is satisfied with such a password. As such, if a password associated with an entity has sequential characters or repetitive characters, this will negatively affect the value of the identity score associated with the entity. In other words, if the entity allows its users to use passwords with sequential characters or repetitive characters, then that is an indication that the entity does not have a robust procedure to ensure the generation of strong passwords by its users.

In some embodiments, credential guardian 220 may determine whether a password associated with an entity includes one or more commonly used (e.g., as determined relative to a reference corpus) dictionary words. In some embodiments, the credential guardian 220 may check for presence of dictionary words in the password. The check may compare the password to a repository of commonly used dictionary words that could be easy targets for hackers. For example, a password such as "password123," "thisispassword," or "yankees" may be an easy target for hackers. Accordingly, the credential guardian 220 may check for the presence of dictionary words (for example, the presence of commonly used dictionary words) in the password by comparing the password to a repository (for example, within the network accessible resource 214) of dictionary words in order to determine whether or not the password is acceptable for usage. Such a repository of dictionary words may include more than 10,000 entries, 100,000 entries, 1 million entries, 10 million entries, 100 million entries, or 1 billion entries. A criterion may be satisfied in response to the determination that the password includes one or more commonly used dictionary words. As such, if a password associated with an entity has one or more commonly used dictionary words, this will negatively affect the value of the identity score associated with the entity. In other words, if the entity allows its users to use passwords with one or more commonly used dictionary words, then that is an indication that the entity does not have a robust procedure to ensure the generation of strong passwords by its users.

In some embodiments, credential guardian 220 may determine whether a password associated with an entity includes one or more context-specific words. For instance, a password such as "Microsoft123" associated with a Microsoft user account may be determined to be context-specific because the password identifies the company name. Further, a password such as "gmail22" associated with a gmail user account may be determined to be context-specific because the password identifies the email address. Additionally, a password such as "johnsmith" associated with a username john.smith@xxx.com may be determined to be context-specific because the password identifies the username. In order to check whether the password includes context-specific words, the credential guardian 220 may retrieve other information associated with the password, for example, username, company name, domain name, etc. from a user account repository 224 or from information provided by a user associated with the password, and based on such other information, the credential guardian 220 may check to see whether a password includes context-specific words. A criterion may be satisfied in response to the determination that the password includes one or more context-specific words. As such, if a password associated with an entity has one or more context-specific words, this will negatively affect the value of the identity score associated with the entity. In other words, if the entity allows its users to use passwords with one or more context-specific words, then that is an indication that the entity does not have a robust procedure to ensure the generation of strong passwords by its users.

In some embodiments, credential guardian 220 may determine whether a password associated with an entity includes characters equal to or greater than a minimum number of characters and equal to or less than a maximum number of characters. For instance, the minimum number of characters may be 8, 10, 12, or any other number and the maximum number of characters may be 16, 32, 64, or any other number. The minimum number and maximum number of characters may be modified based on security needs. In response to determining that the password includes characters less than the minimum number of characters or greater than the maximum number of characters, a criterion may be satisfied. A password less than a minimum number of characters may be easy to guess by cyber criminals and a password that is greater than a maximum number of characters may be harder to remember for a user. Accordingly, creating a password greater than or equal a minimum number of characters and less than or equal to a maximum number of characters is recommended. As such, if a password associated with an entity has less than a minimum number of characters or greater than a maximum number of characters, this will negatively affect the value of the identity score associated with the entity. In some embodiments, if the entity allows its users to use passwords with less than a minimum number of characters or greater than a maximum number of characters, then embodiments may determine that (or output a signal indicative of the fact that) the entity does not have a robust procedure to ensure the generation of strong passwords by its users.

In some embodiments, credential guardian 220 may determine whether a password associated with an entity does not include upper case or special characters. A password without upper case or special characters may be easy to guess by cyber criminals. As such, if a password associated with an entity does not include upper case or special characters, this will negatively affect the value of the identity score associated with the entity. In other words, if the entity allows its users to use passwords without upper case or special characters, then that is an indication that the entity does not have a robust procedure to ensure the generation of strong passwords by its users.

In some embodiments, the breach of other credential data (for example, personal username/password combinations, national identification numbers (for example, social security numbers), addresses, phone numbers, passport numbers, vehicle registration plate numbers, driver's license numbers, credit card numbers, date of births, and birthplaces) of users associated with an entity may be identified. The identity score may be computed based on the identified breach of all the credential data of users associated with an entity.

In some embodiments, weights are assigned to different kinds of breaches. For instance, a breach of username and password combination associated with an entity would be assigned the highest weight and a breach of the birthplace of a user will likely be assigned the lower weight. In some embodiments, a breach of a username and password combination associated with an entity will have greater negative effect on the identity score of the entity compared to a breach of a birthplace of a user associated with an entity. Each of the different breaches may be assigned a different weight and the identity score will be computed based on different weights assigned to different breaches. Accordingly, the identity score generator 227 will compute an identity score not only based on the different kinds of breaches, but also based on weights assigned to the different kinds of breaches. Weights and scores are described herein such that higher values signal greater risk, but the choice of sign is arbitrary, and reference to higher or lower values should be read in terms of risk signaled, e.g., reference to a high score in a system in which positive values signal high risk is synonymous with reference to a low score in a system in which lower or negative values signal high risk.

In some embodiments, the identity score of an entity may be displayed via a user interface (for example, a user interface of a user computing device 232). If multiple identity scores have been computed for an entity over different periods of time, the different identity scores may also be displayed via the user interface. For example, embodiments may send via a network instructions to a remote client computing device that, when executed, cause that device to display (e.g., in a web browser or native application) such a score (which may include displaying graphical attributes indicative thereof, like a red banner indicating a score is above a threshold, without displaying the score itself). Based on the multiple identity scores, a trendline may be generated to illustrate the trend of an entity's identity scores. Based on the trendline, a future identity score may be predicted and illustrated via the user interface. In some embodiments, a chart of different ranges of identity scores may be provided so that an entity can compare its computed score to such a chart. For example, a score of 80-100 may be indicated as a great score, a score of 60-80 may be indicated as an acceptable score, a score of 40-60 may be indicated as a poor score, and a score of 0-40 may be indicated as a critical score. In some embodiments, one facet of a multi-dimensional score may include a value indicative of a first or second order derivative of the trendline. Other dimensions may include identity scores for accounts of the entity versus personal accounts of employees. A dimension may indicate aggregate measures of password entropy, and another dimension may indicate a percentage of credentials breached.

In some embodiments, in addition to the identity score, a reasoning behind the computed identity score may also be provided via the user interface. For example, if the identity score was a poor score (for example, 25) and such a poor score was due to a high ratio of username and password combinations of the entity being breached, the description may indicate that there was a high number (or ratio) of username and password combinations being breached and may provide suggestions (for example, certain guidelines to ensure stronger passwords, such as the ones discussed above) to reduce (or eliminate) such breaches and to improve the entity's identity score. Additionally, details may be identified in a report so that the entity can improve its identity score. For example, a list of username and password combinations that have been found in the compromised credential repository may be listed so as to allow, for example, an administrator of the entity to take action to improve its identity score. A list of each credential data that has been found in the compromised credential repository may be provided via a user interface so as to allow, for example, an administrator of the entity to take action to improve its identity score.

Further, in some embodiments, a user may be informed that his/her username/password combination has been breached and that the user should immediately change his/her password to avoid further breaches. Further, the user may be blocked from accessing his/her account associated with the username/password combination until the user changes his/her password. In some embodiments, an updated identity score for the entity may be computed once the username/password combination has been changed by the user.

In some embodiments, the identity score generator 227 may be a machine learning model (for example, a prediction model, a neural network, a decision tree (like a classification tree) etc.) configured to infer an identity score of an entity based on historical data. In some embodiments, a neural network may be trained (for example, using historical data) and used for predicting (e.g., with a recurrent neural network or Bayesian network) or computing identity scores. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion. Such networks may be trained with various techniques, including various forms of stochastic gradient descent with bootstrap aggregation and cross validation of results.

Identity scores are expected to be useful in determining whether an entity would like to conduct business with another entity, especially when confidential information is involved. The scores allow organizations to pick and choose the entities they wish to work with without having to worry whether their confidential data is secure. The identity scores also help companies identify the strength of their cybersecurity/network security systems and to make improvements to secure highly confidential data. In some embodiments, an application may receive a request for a secure resource, parse from the request an entity identifier, query the entity's identity score, and determine whether (or how fully) to service the request based on whether the score satisfies the threshold. In some cases, different fields or aggregations may be associated with different thresholds. In response to determining that the threshold is not satisfied, some embodiments may determine to not send query results.

Figure 4:
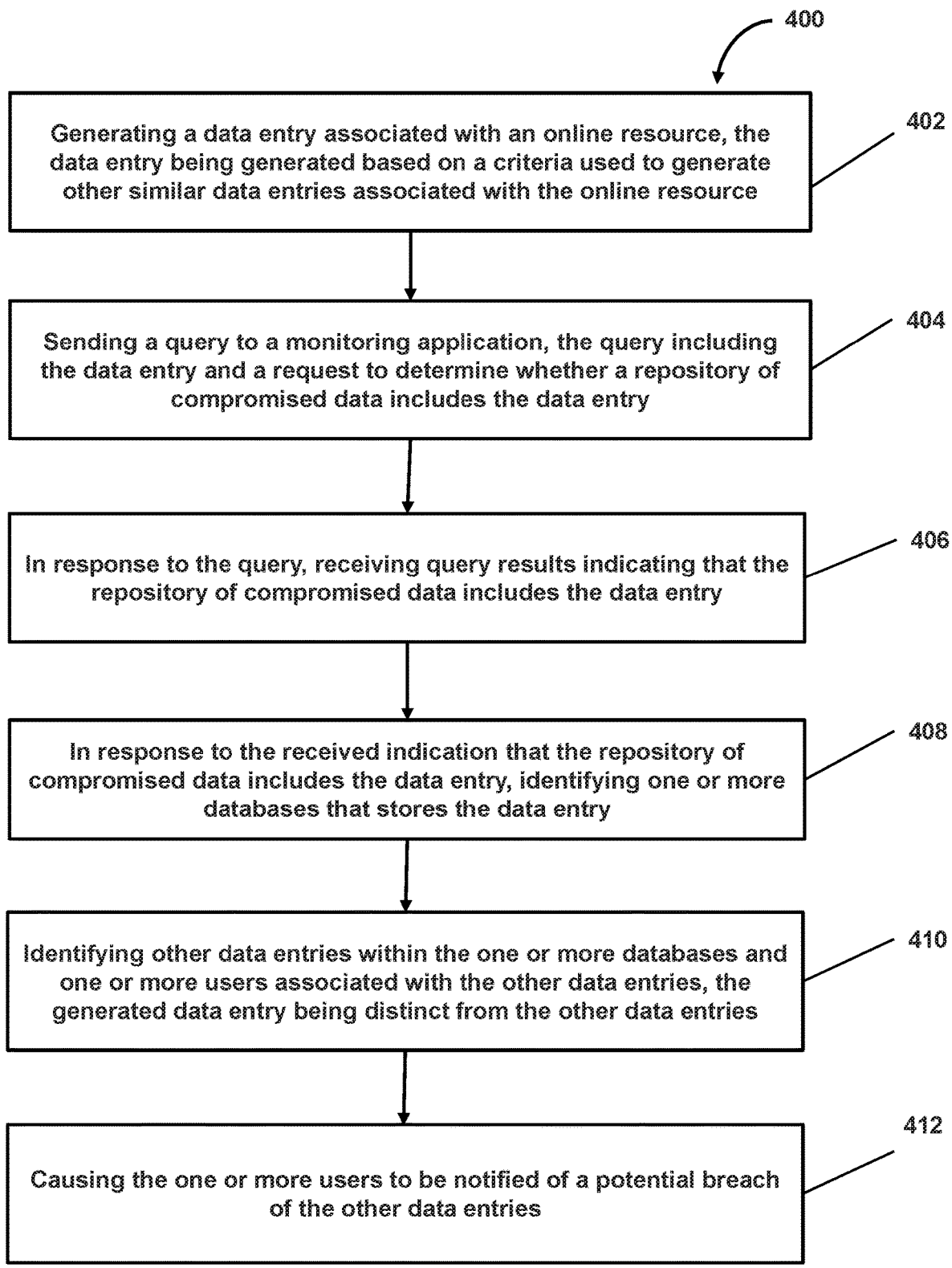
FIG. 4 is a flowchart of an example process of identifying data entries that may have been potentially breached.

FIG. 4 illustrates an example process 400 of identifying data entries that may have been potentially breached. In step 402, a data entry associated with an online resource may be generated. The data entry being generated may be based on a criteria used to generate other similar data entries associated with the online resource. For example, generated data entry may be a username and password combination, which may be generated using one or more criteria that is used to generate other username and password combinations, or may be credit card numbers, which may be generated using one or more criteria that is used to generate other credit card numbers. The one or more criteria to generate the username and password combination may include (a) generating a password without repetitive or sequential characters, (b) generating a password that does not include dictionary words or context-specific words, (c) generating a password that includes characters greater than a minimum number of characters and less than a maximum number of characters, (d) generating a password that has a greater than a threshold amount of entropy, (e) generating a password that includes an upper case letter, a number, or a special character, (f) generating a username in a similar format to other usernames. A credit card number may be generated by including one or more digits that identify an issuer (for example, Visa™, Master Card™, American Express™, etc.), one or more digits that identify the account number associated with the credit card, and a check digit (which is determined solely based on the digits that precede it). The check digit may be generated using the Luhn Algorithm, which works in the following way. For example, if the numbers preceding the check digit (which is the last digit in a credit card number) are 7992739871, then the check digit is determined based on the following criteria: (a1) from the rightmost digit, and moving left, double the value of every second digit (starting with the right most digit); (a2) If any of these doubled values is more than 9, then add the digits; (b) add all the digits from steps (a1) and (a2); and (c) the check digit is chosen so that the sum of the check digit and added value found in step (b) is a divisible of 10.

In step 404, a query (including the data entry and a request to determine whether a repository of compromised data includes the data entry) may be sent to a monitoring application. In some embodiments, the query may identify a plurality of data entries that have been generated and may include a request to determine whether the compromised credential repository includes the plurality of data entries. In step 406, query results indicating that the repository of compromised data includes the data entry may be received in response to the query. A comparison between the data entry (or plurality of data entries) and the compromised credential data in the repository of compromised data may be performed using one or more comparison techniques described above.

In step 408, one or more databases that stores the data entry may be identified in response to the received indication that the repository of compromised data includes the data entry and in step 410 other data entries within the one or more databases (which has been identified as storing the data entry) and one or more users associated with the other data entries may be identified. Finally, in step 412, the one or more users may be notified of a potential breached of the other data entries. For example, a user may be informed that his/her username/password combination has been breached (or likely been breached) and that the user should immediately change his/her password to avoid further breaches. Further, the user may be blocked from accessing his/her account associated with the username/password combination until the user changes his/her password. In a case where the other data entries are credit card numbers, a user associated with the credit card number may be identified and informed of a breach (or a likely breach) of his/her credit card information. The user also may be informed (e.g., embodiments may send a message to a computing device associated with the user) that a new credit card number and credit card will be sent to the user shortly and that the user will be unable to use his/her current credit card.

Figure 5:
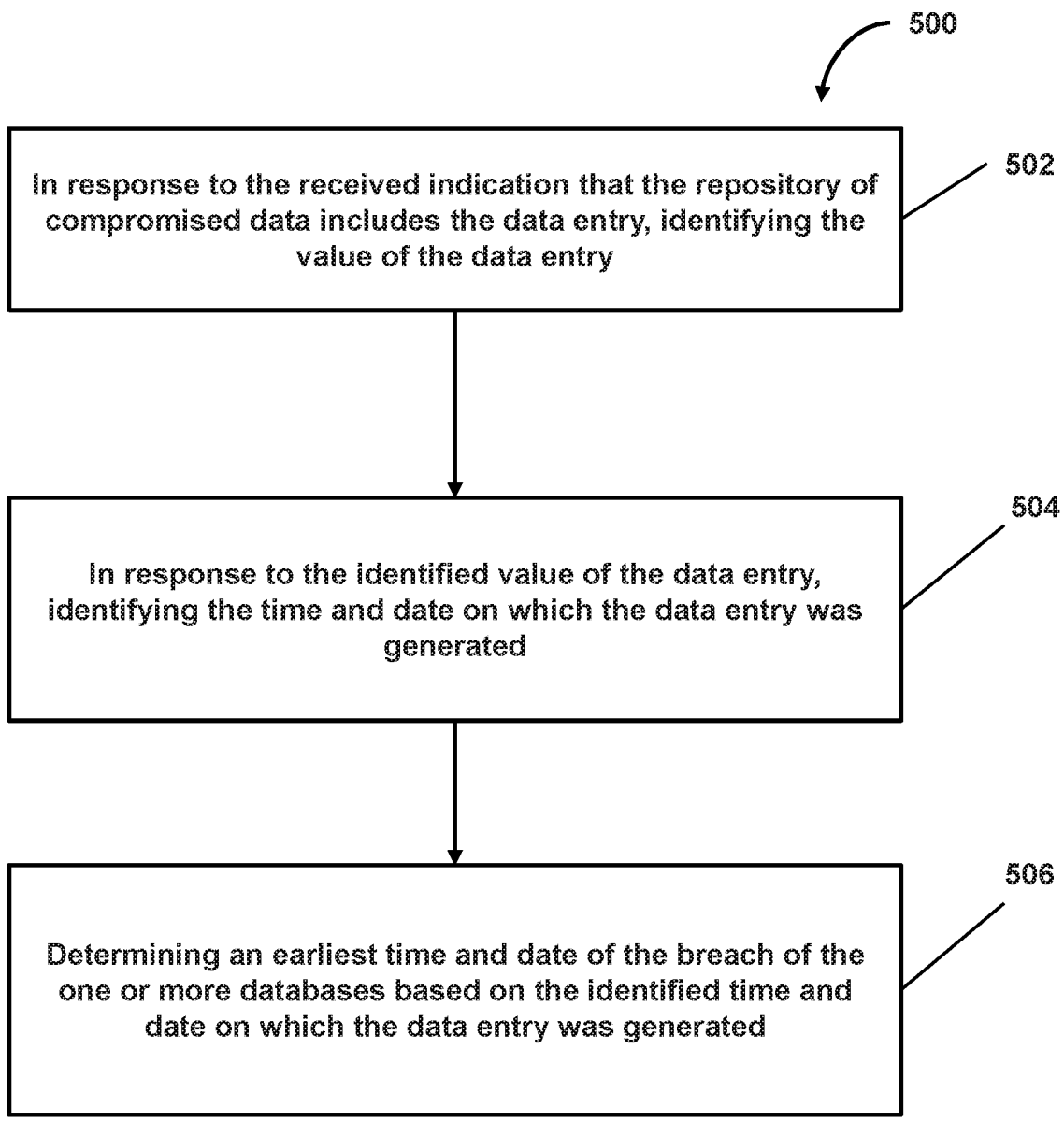
FIG. 5 is a flowchart of an example process of determining a time and date of breach of one or more databases.

FIG. 5 illustrates an example process 500 of determining a time and date of breach of one or more databases. In step 502, a value of the data entry may be identified in response to a received indication (see step 406 in FIG. 4) that the repository of compromised data includes the data entry. In some embodiments, additional information may be embedded in a generated data entry. Such information may include (for example, date, month, year, etc.) of generation of the data entry. For example, a password starting with 'A18' may indicate that the password was generated in January 2018. Additionally, for example, a credit card number having digits '118' may indicate that the credit card number was generated in January 2018. As such, in order to identify the embedded information, a value of the data entry may be identified in response to a received indication that the repository of compromised data includes the data entry.

In step 504, the time and date the data entry was generated may be identified in response to the identified value of the data entry. For example, in response to identifying that the value of the data entry to be 'A18', the data entry may be identified as being generated in January 2018. In step 506, an earliest time and date of the breach of the one or more databases may be determined based on the identified time and date on which the data entry was generated. For example, if the identified date of a data entry is January 2018 (and such data entry was found in the repository of compromised data), then it can be determined that the earliest date on which the one or more databases (which includes the data entry) was breached is January 2018. Accordingly, a time and date of breach of one or more databases may be determined based on information embedded within the data entry.

Figure 6:
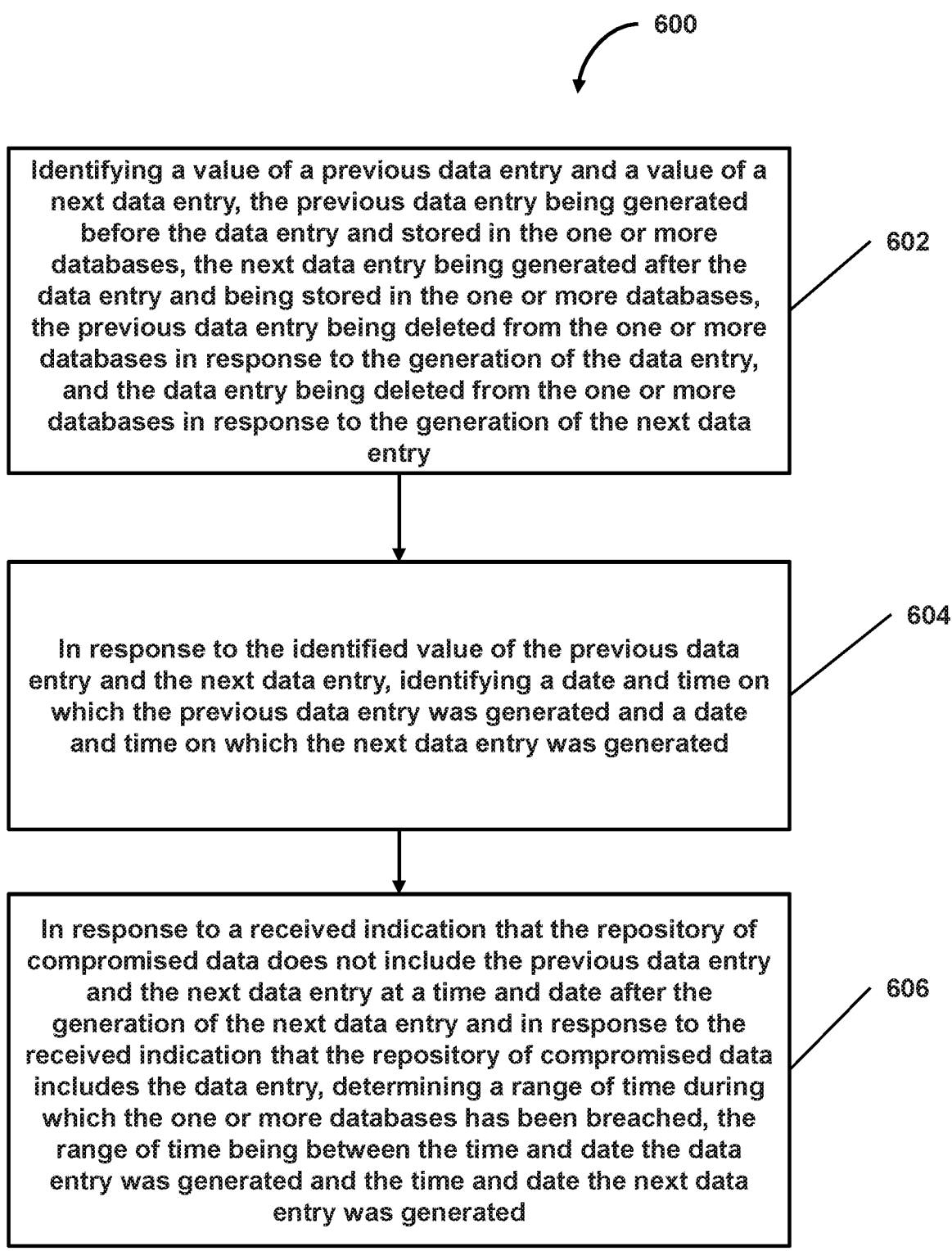
FIG. 6 is a flowchart of an example process of determining a range of time of breach of one or more databases.

FIG. 6 illustrates an example process 600 of determining a range of time of breach of one or more databases. In step 602, a value of a previous data entry and a value of a next data entry are identified. Here, in some embodiments, the previous data entry is generated before the data entry and stored in the one or more databases and the next data entry is generated after the data entry and stored in the one or more databases. Further, in some embodiments, the previous data entry may be deleted from the one or more databases in response to the generation of the data entry and the data entry may deleted from the one or more databases in response to the generation of the next data entry. As an example, data entry A may be added to database 1 at 7:30 pm on Jan. 1, 2018, data entry B may be added to database 1 at 9:30 pm on Jan. 1, 2018 (and subsequently data entry A may be deleted from database 1), and data entry C may be added to database 1 at 11:30 pm on Jan. 1, 2018 (and subsequently data entry B may be deleted from database 1).

In step 604, a date and time on which the previous data entry was generated the next data entry was generated may be identified in response to the identified value of the previous data entry and the next data entry. As an example, a password starting with 'A18' may indicate that the password was generated in January 2018. Accordingly, a date and time on which a password was generated may be identified in response to identifying a value (for example, 'A18') of the password. In step 606, a range of time during which the one or more databases has been breached may be determined in response to a received indication that the repository of compromised data does not include the previous data entry and the next data entry at a time and date after the generation of the next data entry and in response to the received indication that the repository of compromised data includes the data entry. Here, in some embodiments, the range of date may be between the time and date the data entry was generated and the time and date the next data entry was generated. As an example, if data entry A is added to database 1 at 7:30 pm on Jan. 1, 2018, data entry B is added to database 1 at 9:30 pm on Jan. 1, 2018 (and at the same time or subsequently data entry A is deleted from database 1), and data entry C is added to database 1 at 11:30 pm on Jan. 1, 2018 (and at the same time or subsequently data entry B is deleted from database 1), and if data entry B is the only data entry found in the compromised credential repository at 11:45 pm, it could be concluded that other data entries (or online resources associated with the other data entries) that were present in database 1 between 7:30 pm and 11:30 pm on Jan. 1, 2018 may have been potentially breached/exposed.

Figure 7:
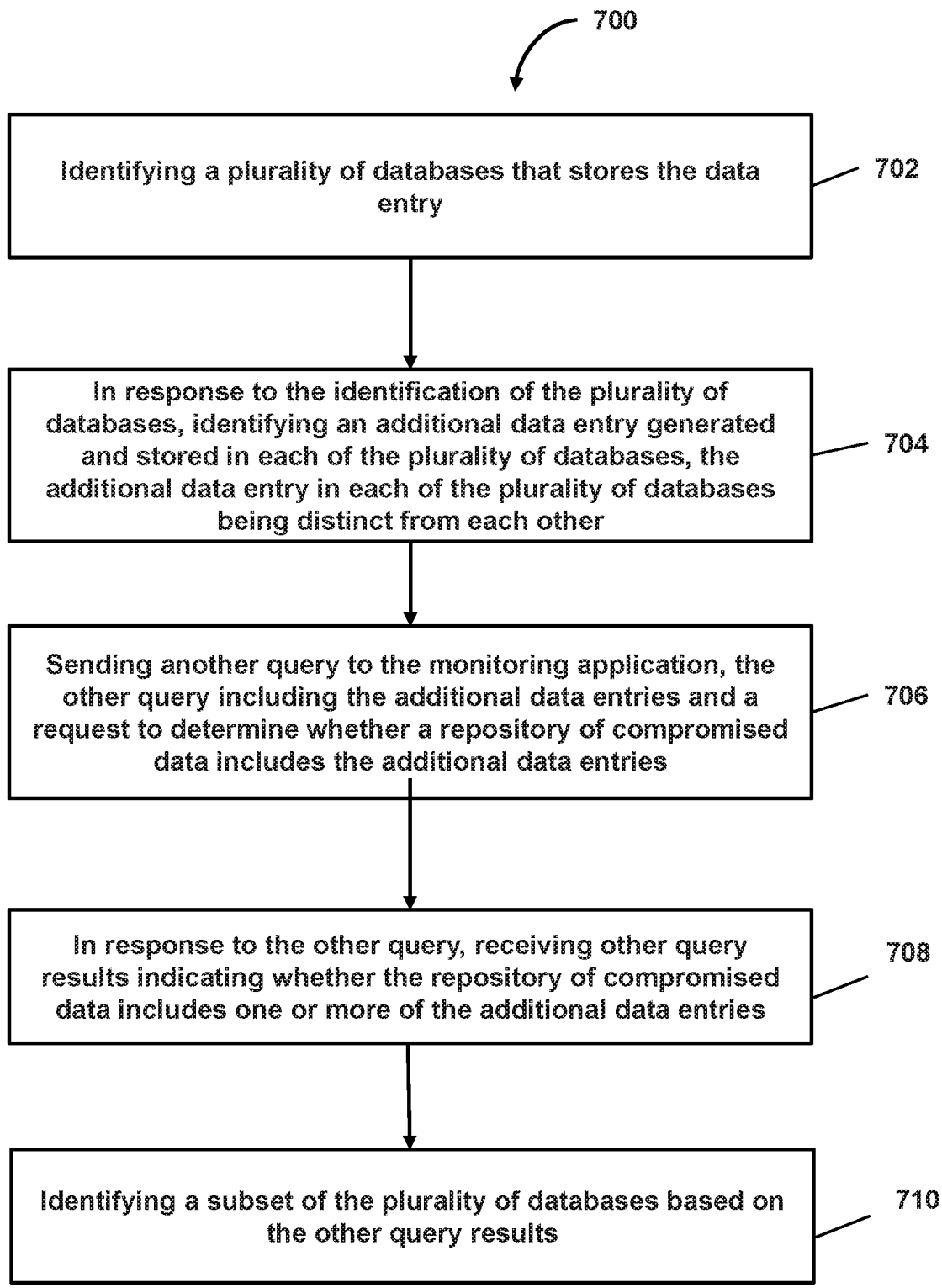
FIG. 7 is a flowchart of an example process of identifying a subset of a plurality of databases that may have been breached.

FIG. 7 illustrates an example process 700 of identifying a subset of a plurality of databases that may have been breached. In step 702, a plurality of databases that store the data entry may be identified. For example, databases 1 and 2 may be identified as storing data entry A (which has been determined to have been found in a repository of compromised data). In step 704, an additional data entry generated and stored in each of the plurality of databases may be identified in response to the identification of the plurality of databases. The additional data entry in each of the plurality of databases may be distinct from each other. As an example, data entry B may be identified as being stored in database 1 and data entry C (distinct from data entry B) may be identified as being stored in database 2.

In step 706, another query may be sent to a monitoring application, where the query includes the additional data entries and a request to determine whether a repository of compromised data includes the additional data entries. In step 708, a query result may be received where the query result indicates whether the repository of compromised data includes the additional data entries. For example, query results may be received which indicate that data entry B is included in the repository of compromised data and that data entry C is not included in the repository of compromised data. In step 710, a subset of the plurality of databases may be identified to have been breached based on the query results. For example, since data entry B is included in the repository of compromised data and data entry C is not included in the repository of compromised data, database 1 (which stores both data entry A and data entry B) may be identified as a database that has been breached. Accordingly, a database that has been breached may be identified.

Figure 8:
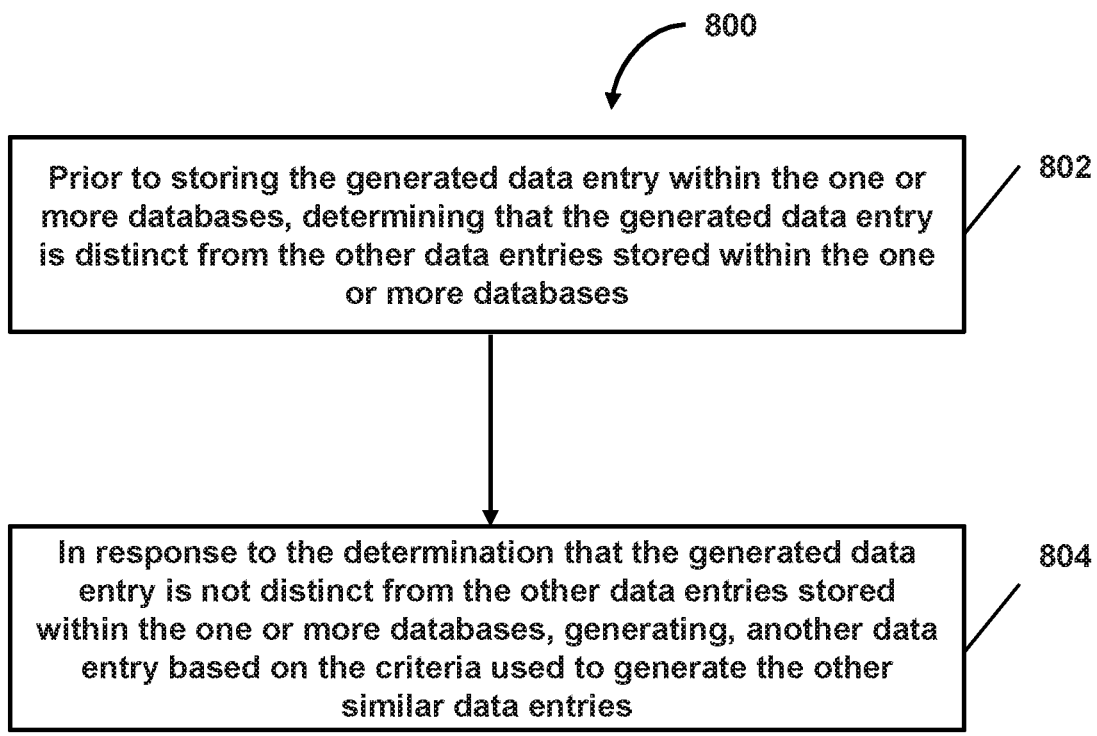
FIG. 8 is a flowchart of an example process of ensuring that the generated data entry is a unique data entry.

FIG. 8 illustrates an example process 800 of ensuring that the generated data entry is a unique data entry. In step 802, prior to storing the generated data entry within one or more databases, a determination may be made as to whether the generated date entry is distinct from other data entries stored within one or more databases. Further, in some embodiments, the generated data entry may be compared to the repository of compromised data to determine whether the data entry is within the repository of compromised data. In response to the determination that the generated data entry is not distinct from the other data entries stored within the one or more databases or that the generated data entry is within the repository of compromised data, a new data entry may be generated in step 804 (based on the criteria used to generate the other similar data entries) and the same process of comparing the newly generated data entry to other data entries within the one or more databases and to the repository of compromised credential data may be performed. Only when a generated data entry is distinct from the other data entries within the one or more databases and is not within the repository of compromised credential data, the generated data entry is stored (for example, as a fake data entry) in one or more databases.

Figure 9:
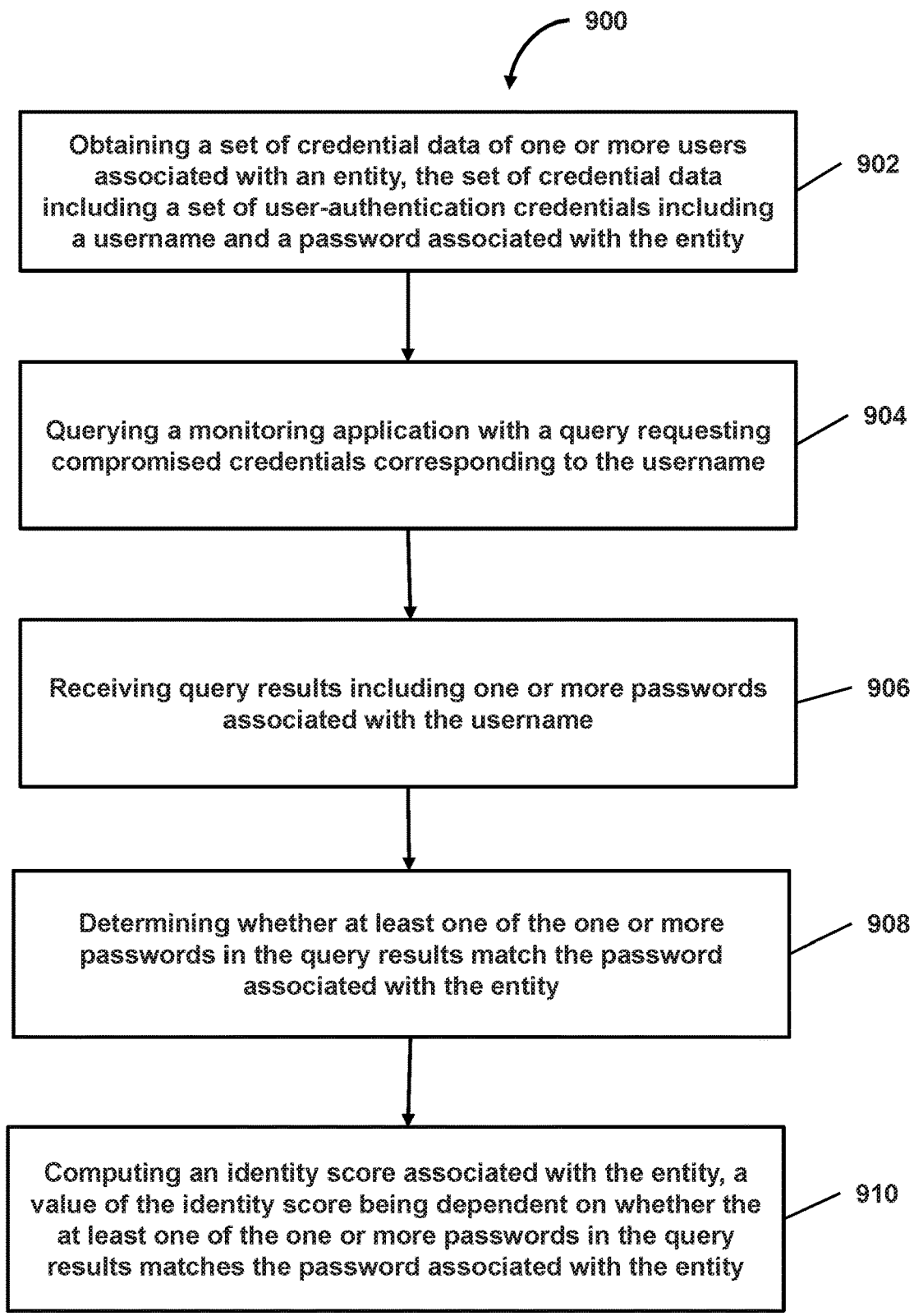
FIG. 9 is a flowchart of an example process of computing an identity score associated with an entity.

FIG. 9 illustrates an example process 900 of computing an identity score associated with an entity. In step 902, a set of credential data of one or more users associated with an entity may be obtained. In some embodiments, the set of credential data may include a set of user-authentication credentials including a username and a password associated with the entity. In step 904, a monitoring application may be queried with a query. The query may include a request for compromised credentials corresponding to the username. In other words, the query includes a request for one or more passwords that are associated with the username in the repository of compromised credential data.

In step 906, query results are received. These query results may include one or more passwords associated with the username. In step 908, a determination may be made as to whether the one or more password in the query results match the password associated with the entity. Finally, in step 910, an identity score associated with an entity may be computed, where the value of the identity score may be dependent on whether the one or more password in the query results matches the password associated with the entity. For example, a password (received in the query results) that matches a password associated with the entity may negatively affect the identity score of an entity. On the other hand, when there are no password matches, the identity score of an entity will not be negatively affected.

Figure 10:
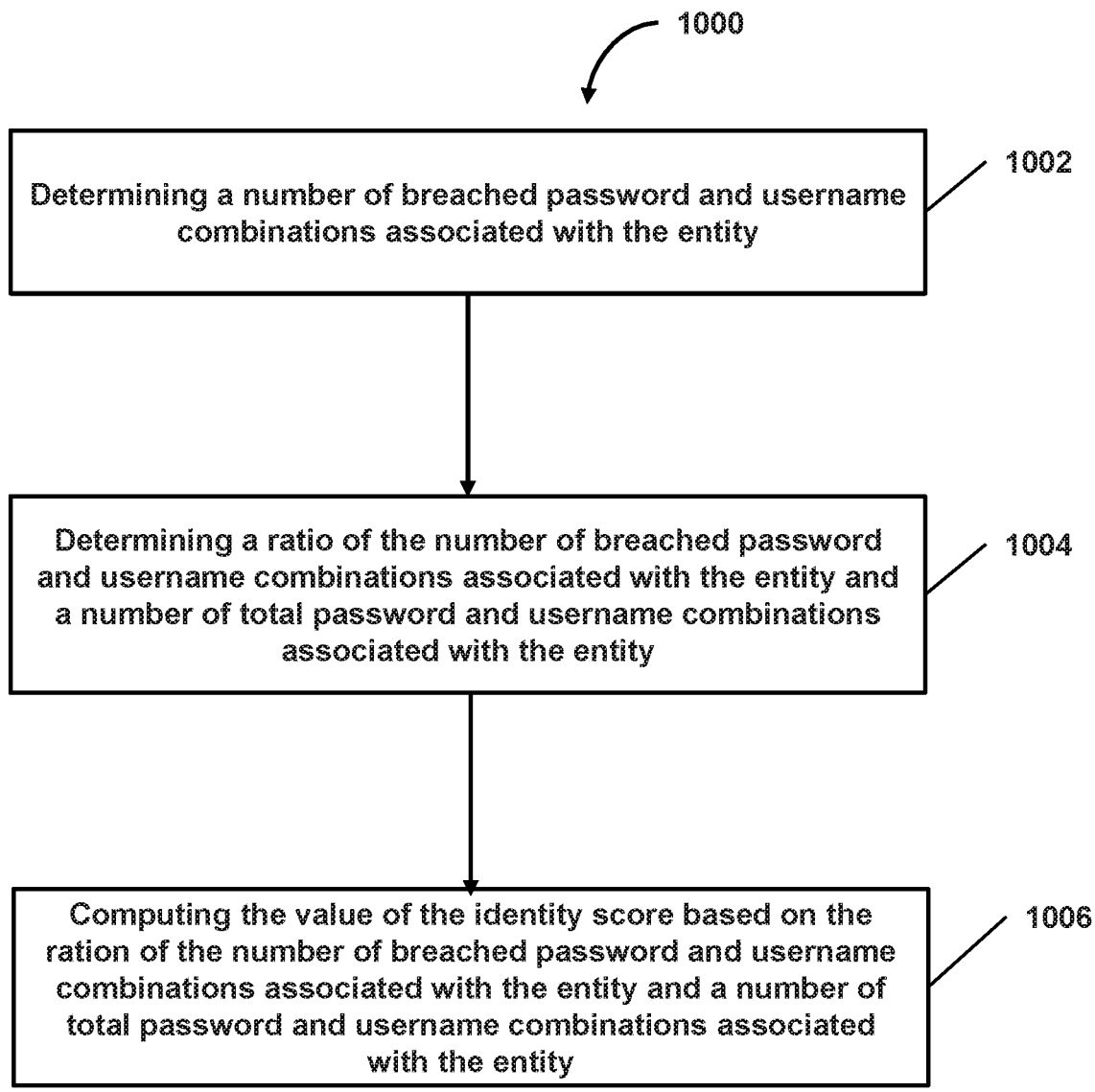
FIG. 10 is a flowchart of an example process of computing an identity score associated with an entity based on a ratio of number of breached password and username combinations and a number of total password and username combinations associated with an entity.

FIG. 10 illustrates an example process 1000 of computing an identity score associated with an entity based on a ratio of number of breached password and username combinations and a number of total password and username combinations associated with an entity. In step 1002, a number of breached password and username combinations associated with an entity may be determined. For example, a plurality of usernames associated with an entity may be queried and a plurality of passwords associated with the plurality of usernames may be received in the query results based on a comparison of the plurality of username and data in a repository of compromised credential data. Accordingly, a number of breached password and username combinations associated with an entity may be determined. In step 1004, a ratio of the number of breached password and username combinations associated with the entity and a number of total password and username combinations associated with the entity may be determined. For example, a number of total password and username combinations associated with the entity may be determined based on a total number of employees of an entity.

In step 1006, a value of the identity score may be computed based on the ratio of the number of breached password and username combinations associated with the entity and the number of total password and username combinations associated with the entity may be determined. For example, a first entity may have 200 employees and this entity may have 20 username and password combinations breached. Accordingly, the ratio is determined to be 10% (20/200=0.1) for this entity. On the other hand, a second entity may only have 2 breached username and password combinations, but that entity may only have 4 employees. In such a case, the ratio of this second entity will be 50% (2/4=0.5). Although the second entity has a lower number of breached username and password combinations than the first entity, the identity score of the second entity will be more negatively affected than the identity score of the first entity because of the ratio.

Figure 11:
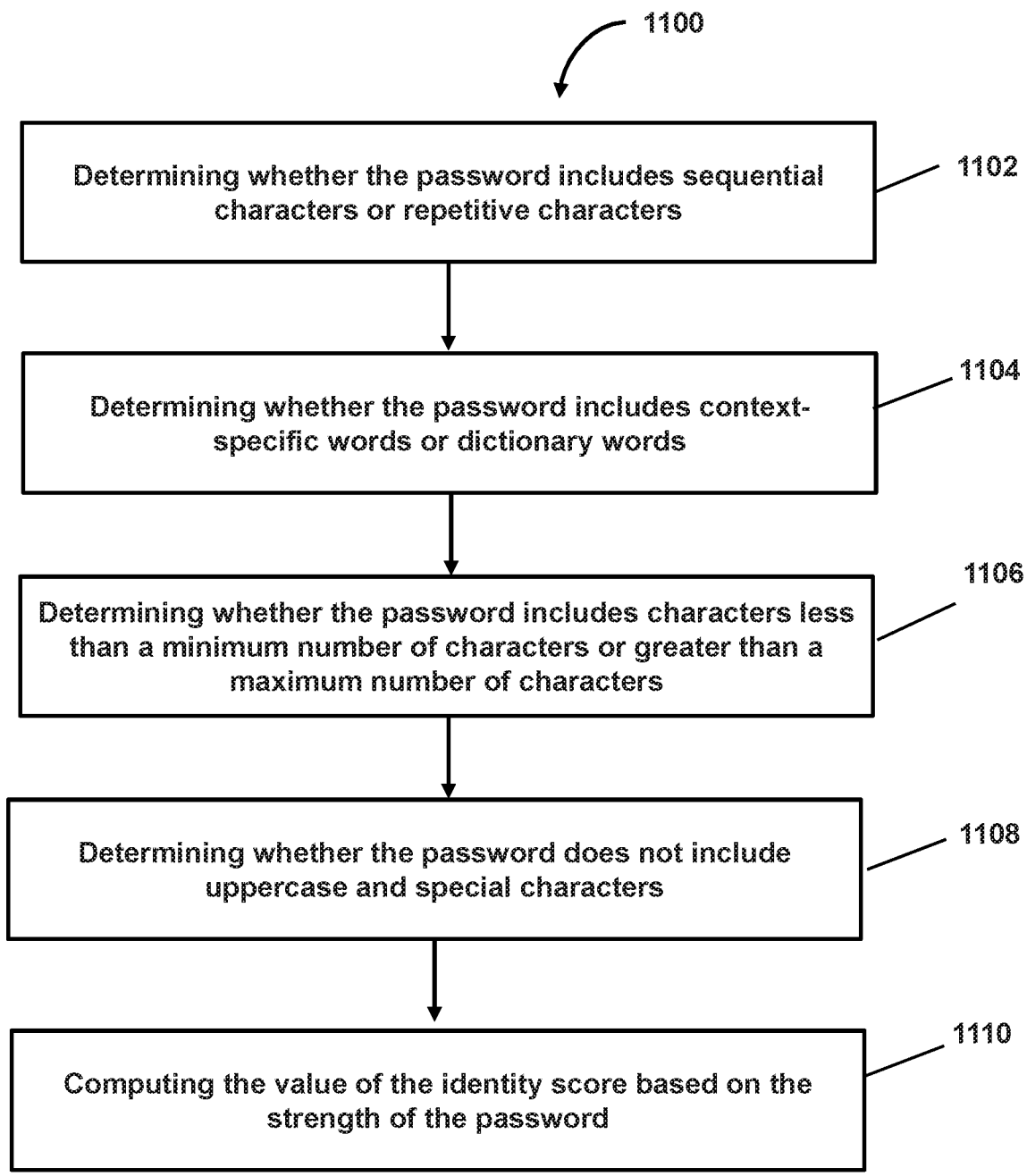
FIG. 11 is a flowchart of an example process of computing an identity score based on a strength of one or more passwords.

FIG. 11 illustrates an example process 1100 of computing an identity score based on a strength of one or more passwords. The strength of one or more passwords may be determined based on (a) whether a password includes repetitive or sequential characters, (b) whether a password includes dictionary words or context-specific words, (c) whether a password includes characters less than a minimum number of characters or greater than a maximum number of characters, and (d) whether a password does not include uppercase and special characters. In step 1102, a determination may be made as to whether a password associated with an entity includes repetitive characters or sequential characters. For instance, a password such as "aaa123" or "aaabbb" may be determined to include repetitive characters and a password such as "abc8281" may be determined to include sequential characters (since the first three characters "abc" are sequential characters in the alphabet). A password with repetitive or sequential characters may be considered to be a weak password. In Step 1104, a determination may be made as to whether a password associated with an entity includes one or more commonly used dictionary words or context-specific words. For example, a password such as "password123," "thisispassword," or "yankees" may be considered to include one or more commonly used dictionary words and a password such as "gmail22" associated with a gmail user account may be determined to be context-specific. A password that includes one or more dictionary words or content-specific words may be considered a weak password.

In step 1106, a determination made be made as to whether a password associated with an entity includes characters equal to or greater than a minimum number of characters and equal to or less than a maximum number of characters. For instance, the minimum number of characters may be 8, 10, 12, or any other number and the maximum number of characters may be 16, 32, 64, or any other number. A password less than a minimum number of characters may be easy to guess by cyber criminals and a password that is greater than a maximum number of characters may be harder to remember for a user. In step 1108, a determination may be made as to whether a password associated with an entity does not include upper case or special characters. A password without upper case or special characters may be easy to guess by cyber criminals, and therefore, may be weak. Based on the different criteria to checking the strength of a password, a strength score may be assigned to each password. In step 1110, a value of the identity score may be computed based on the strength (for example, based on the strength score) of the password.

Figure 12:
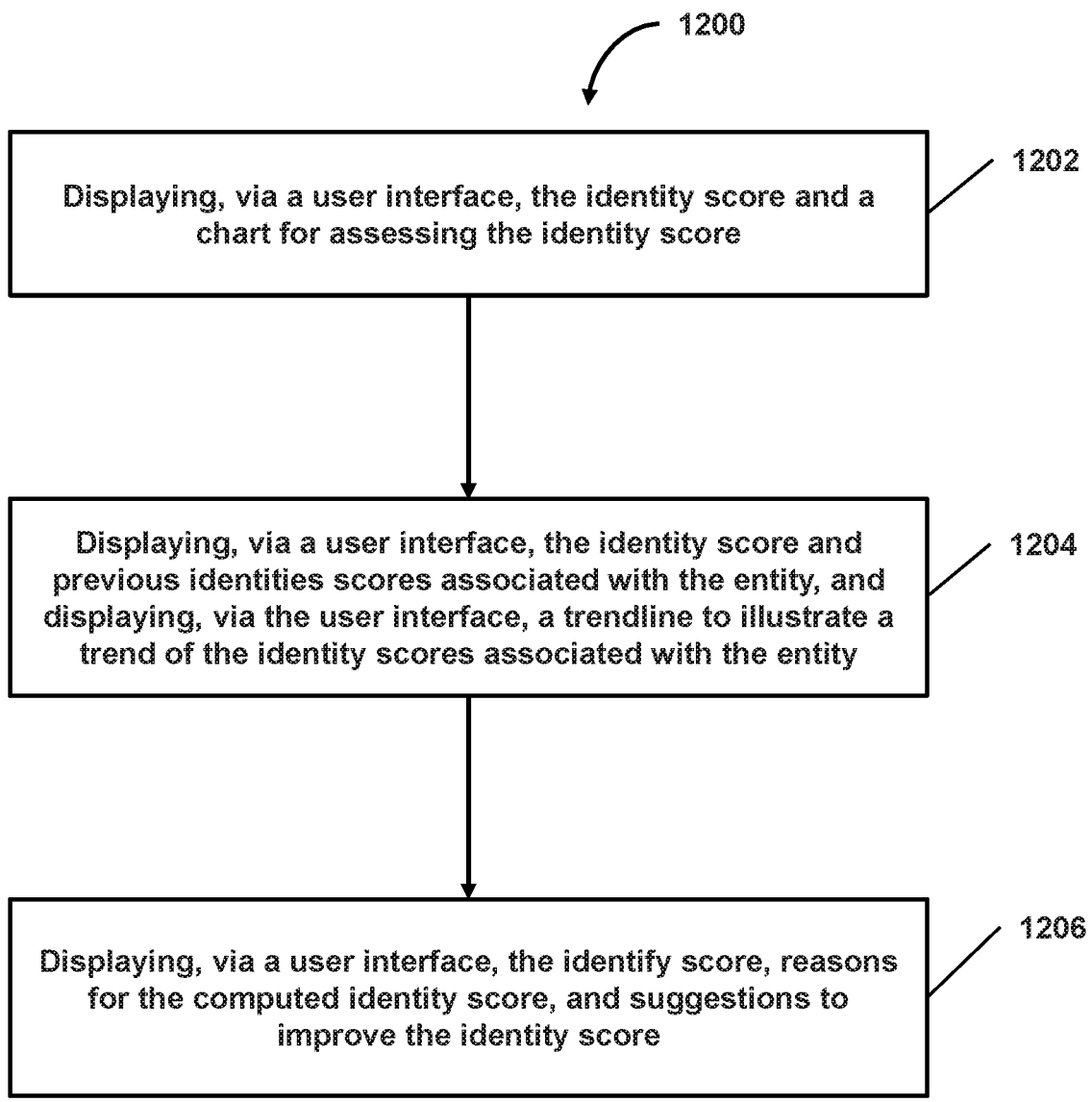
FIG. 12 is a flowchart of an example process of displaying the identity score and other information via a user interface.

FIG. 12 illustrates an example process 1200 of displaying the identity score and other information via a user interface. In step 1202, the identity score and a chart for assessing the identity score may be displayed via a user interface. In some embodiments, a chart of different ranges of identity scores may be provided so that an entity can compare its computed score to such a chart. For example, a score of 80-100 may be indicated as a great score, a score of 60-80 may be indicated as an acceptable score, a score of 40-60 may be indicated as a poor score, and a score of 0-40 may be indicated as a critical score. If multiple identity scores have been computed for an entity over different periods of time, the different identity scores may also be displayed via the user interface in step 1204. Further, in step 1204, a trendline to illustrate a trend of the identity scores associated with the entity may also be displayed via the user interface. In step 1206, the identity score may be displayed along with reasons for the computed identity score and suggestions to improve the identity score. For example, if the identity score was a poor score (for example, 25) and such a poor score was due to a high ratio of username and password combinations of the entity being breached, the description may indicate that there was a high number (or high ratio) of username and password combinations being breached and may provide suggestions (for example, certain guidelines to ensure stronger passwords, such as the ones discussed above) to reduce (or eliminate) such breaches and to improve the entity's identity score.

The present patent filing is one of a set of two filed on the same day by the same applicant, members of the set have the following titles: GENERATING AND MONITORING FICTITIOUS DATA ENTRIES TO DETECT BREACHES; and MEASURING DATA-BREACH PROPENSITY. The entire content of each of the patent filings other than this one is hereby incorporated by reference. Further, embodiments may monitor and respond to breached credentials with techniques like those described in US patent filings with the following titles (and application numbers): DETECTING USE OF COMPROMISED SECURITY CREDENTIALS IN PRIVATE ENTERPRISE NETWORKS (filed as U.S. provisional application No. 62/753,812); DETERMINING THE INTERSECTION OF A SET OF COMPROMISED CREDENTIALS WITH A SET OF ACTIVE CREDENTIALS WITH DATA STRUCTURES AND ARCHITECTURES THAT EXPEDITE COMPARISONS (filed as U.S. provisional application No. 62/753,800); FILTERING PASSWORDS BASED ON A PLURALITY OF CRITERIA (filed as U.S. provisional application No. 62/753,807); DETECTING USE OF PASSWORDS THAT APPEAR IN A REPOSITORY OF BREACHED CREDENTIALS (filed as U.S. provisional application No. 62/753,793) are also hereby incorporated by reference.

Figure 13:
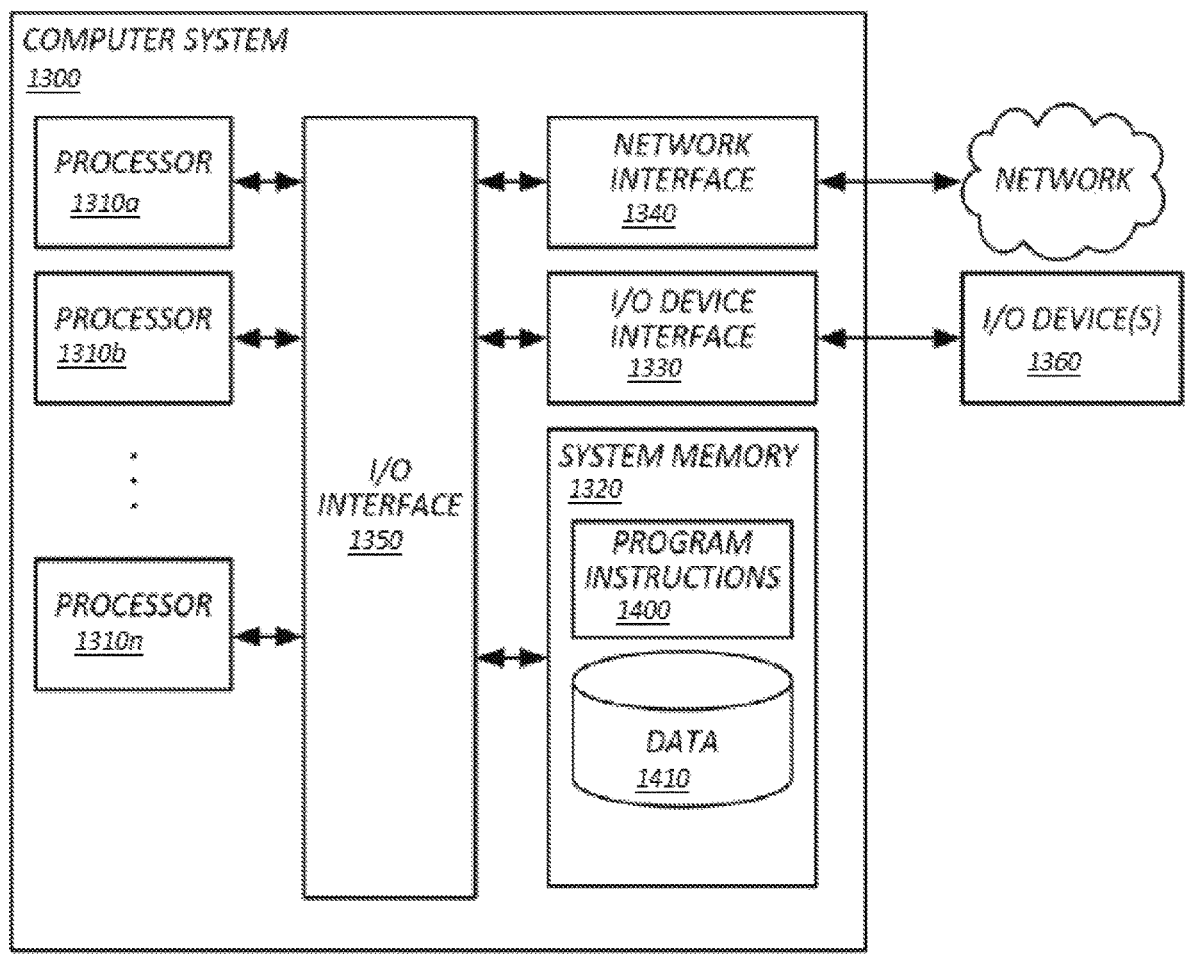
FIG. 13 is an example of a computing device by which the above techniques may be implemented.

FIG. 13 is a diagram that illustrates an exemplary computing device 1300 in accordance with embodiments of the present technique. Various portions of systems and methods described herein, may include or be executed on one or more computer systems similar to computing device 1300. Further, processes and modules described herein may be executed by one or more processing systems similar to that of computing device 1300.

Computing device 1300 may include one or more processors (e.g., processors 1310*a*-1310*n*) coupled to system memory 1320, an input/output I/O device interface 1330, and a network interface 1340 via an input/output (I/O) interface 1350. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing device 1300. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1320). Computing device 1300 may be a uni-processor system including one processor (e.g., processor 1310*a*), or a multi-processor system including any number of suitable processors (e.g., 1310*a*-1310*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing device 1300 may include a plurality of computing devices (e.g., distributed computer systems) to implement various processing functions.

I/O device interface 1330 may provide an interface for connection of one or more I/O devices 1360 to computing device 1300. I/O devices may include devices that receive input (e.g., from a user) or output information (e.g., to a user). I/O devices 1360 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1360 may be connected to computing device 1300 through a wired or wireless connection. I/O devices 1360 may be connected to computing device 1300 from a remote location. I/O devices 1360 located on remote computer system, for example, may be connected to computing device 1300 via a network and network interface 1340.

Network interface 1340 may include a network adapter that provides for connection of computing device 1300 to a network. Network interface 1340 may facilitate data exchange between computing device 1300 and other devices connected to the network. Network interface 1340 may support wired or wireless communication. The network may include an electronic communication network, such as the Internet, a local area network (LAN), a wide area network (WAN), a cellular communications network, or the like.

System memory 1320 may be configured to store program instructions 1400 or data 1410. Program instructions 1400 may be executable by a processor (e.g., one or more of processors 1310*a*-1310*n*) to implement one or more embodiments of the present techniques. Instructions 1400 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1320 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1320 may include a non-transitory computer readable storage medium that may have program instructions stored thereon that are executable by a computer processor (e.g., one or more of processors 1310*a*-1310*n*) to cause the subject matter and the functional operations described herein. A memory (e.g., system memory 1320) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1350 may be configured to coordinate I/O traffic between processors 1310*a*-1310*n*, system memory 1320, network interface 1340, I/O devices 1360, and/or other peripheral devices. I/O interface 1350 may perform protocol, timing, or other data transformations to convert data signals from one component (e.g., system memory 1320) into a format suitable for use by another component (e.g., processors 1310*a*-1310*n*). I/O interface 1350 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing device 1300 or multiple computing device 1300 configured to host different portions or instances of embodiments. Multiple computing devices 1300 may provide for parallel or sequential processing/execution of one or more portions of the techniques described herein.

Those skilled in the art will appreciate that computing device 1300 is merely illustrative and is not intended to limit the scope of the techniques described herein. Computing device 1300 may include any combination of devices or software that may perform or otherwise provide for the performance of the techniques described herein. For example, computing device 1300 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing device 1300 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing device 1300 may be transmitted to computing device 1300 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with one or more processors, a fictitious data entry associated with a field present in a plurality of records associated with an online resource, wherein: the fictitious data entry is generated based on a criteria used to generate other non-fictitious data entries associated with the field in at least some of the records, the fictitious data entry is caused to be stored in at least some of the records in association with the field in a first set of one or more repositories to be monitored for breaches, the fictitious data entry is different from the non-fictitious data entries, and the fictitious data entry complies with a syntax of the non-fictitious entries; sending, with one or more processors, a query to a monitoring application, the query specifying the fictitious data entry and a request to determine whether a second repository of compromised data includes the fictitious data entry; in response to the query, receiving, with one or more processors, query results indicating that the second repository of compromised data includes the fictitious data entry; in response to the received indication that the second repository of compromised data includes the fictitious data entry, identifying, with one or more processors, at least some of the first set of one or more repositories that store the data entry; designating, with one or more processors, other data entries within the at least some of the first set of one or more repositories as potentially having been breached; and storing, with one or more processors, the designation in memory.

2. The medium of embodiment 1, wherein generating the fictitious data entry includes storing, in memory, a value indicative of a date on which the data fictitious entry was stored in the first set of one or more repositories.

3. The medium of embodiment 2, wherein the operations comprise: in response to the received indication that the second repository of compromised data includes the fictitious data entry, accessing, with one or more processors, the value indicative of the date on which the data fictitious entry was stored in the first set of one or more repositories; and inferring, with one or more processors, a date of a breach of the first set of one or more repositories based on the value.

4. The medium of embodiment 3, wherein within the at least some of the first set of one or more repositories as potentially having been breached comprises selecting a subset of records in the first set of one or more repositories and designating the subset of records as potentially having been breached based on the subset of records predating the inferred date.

5. The medium of embodiment 2, wherein the operations comprise: identifying, with one or more processors, a previous fictitious data entry and a next fictitious data entry, the previous fictitious data entry being stored therein before the fictitious data entry, the next fictitious data entry being stored therein after the fictitious data entry, the previous fictitious data entry being deleted from the first set of one or more repositories in response to the storing of the data fictitious entry, and the data entry being deleted from the one or more databases in response to the storing of the next data entry; in response to identifying the previous fictitious data entry and the next fictitious data entry, identifying, with one or more processors, a date and time on which the previous fictitious data entry was generated and a date and time on which the next fictitious data entry was generated; in response to a received indication that the repository of compromised data does not include the previous fictitious data entry and the next fictitious data entry at a time and date after the generation of the next fictitious data entry and in response to the received indication that the repository of compromised data includes the data fictitious entry, determining a range of time during which the first set of one or more repositories has been breached, the range of time being between the time and date the fictitious data entry was stored in the first set of one or more repositories and the time and date the next fictitious data entry was stored in the first set of one or more repositories.
6. The medium of embodiment 5, wherein a subset of the other data entries within the first set of one or more repositories is identified based on the determined range of time.
7. The medium of any one of embodiments 1-6, wherein the operations comprise: identifying, with one or more processors, the first set of one or more repositories that stores the fictitious data entry; in response to the identification of the first set of one or more repositories, identifying, with one or more processors, an additional fictitious data entries generated and stored in each of the first set of one or more repositories, the respective additional fictitious data entries in each of first set of one or more repositories being distinct from each other; sending, with one or more processors, another query to the monitoring application, the other query including the additional fictitious data entries and a request to determine whether a repository of compromised data includes the additional fictitious data entries; in response to the other query, receiving, with one or more processors, other query results indicating whether the repository of compromised data includes one or more of the additional data entries; and identifying, with one or more processors, a subset of the first set of one or more repositories based on the other query results.
8. The medium of embodiment 7, wherein identifying the other fictitious data entries within the first set of one or more repositories includes identifying a subset of the other data entries within the subset of the first set of one or more repositories.
9. The medium of any one of embodiments 1-8, wherein the fictitious data entry includes a set of user-authentication credentials comprising a first username and a first fictitious password and wherein the first username and the first fictitious password are generated based on the criteria used to generate other usernames and passwords.
10. The medium of embodiment 9, wherein: designating comprises determining the first username and first password has been breached; and the operations comprise: causing, with one or more processors, the one or more users associated with the other usernames and passwords to be notified to change the other passwords; and blocking, with one or more processors, access to one or more user accounts associated with the other usernames and passwords that have been breached.
11. The medium of any one of embodiments 1-10, wherein: the data entry includes at least one of a credit card number, gift card number, or voucher code and wherein the credit card number, gift card number, or voucher code is generated based on the criteria used to generate other credit card numbers, gift card numbers, or voucher codes for accessing the online resource; and the operations comprise, in response to the indication that at least one of the credit card number, gift card number, or voucher code has been breached, causing, with one or more processors, the one or more users associated with the other credit card numbers, gift card numbers, or voucher codes to be notified of the breach.
12. The medium of any one of embodiments 1-11, wherein: obtaining the fictitious data entry comprises: generating a first part of the fictitious data entry; computing a second part of the fictitious data entry based on the first part, the second part containing redundant information relative to the first part; and conjoining the first part and the second part in the fictitious data.
13. The medium of any one of embodiments 1-12, wherein: a set of rules specify whether a date entry in the field is valid; and obtaining the fictitious data entry comprises: determining more than a threshold number of characters for the fictitious data entry, the threshold being specified by one of the rules; determining a non-alphanumeric character for the fictitious data entry to comply with one of the rules; determining a numeric character for the fictitious data entry to comply with one of the rules; and determining a case of a character for the fictitious data entry to comply with one of the rules.
14. The medium of any one of embodiments 1-13, wherein the operations comprise: periodically generating, with one or more processors, a new fictitious data entry; and storing the new fictitious data entry in the first set of one or more repositories.
15. The medium of any one of embodiments 1-14, wherein: before sending the query, respective hash values are computed based on entries in the repository of compromised data; and the fictitious data entry is determined to be included in the repository of compromised data with operations including: computing a hash value based on the fictitious data entry; determining that the hash value based on the fictitious data entry matches one of the respective hash values based on entries in the repository of compromised data; and in response to the match, determining the fictitious data entry is included in the repository of compromised data.
16. The medium of any one of embodiments 1-15, wherein: the fictitious data entry is generated using a generative machine learning model trained on a training set including non-fictitious data entries to distinguish fictitious from non-fictitious data entries.
17. The medium of any one of embodiments 1-16, wherein the operations comprise: prior to storing the generated data entry within the one or more databases, determining, with one or more processors, that the generated data entry is distinct from the other data entries stored within the one or more databases; and in response to the determination that the generated data entry is not distinct from the other data entries stored within the one or more databases, generating, with one or more processors, another data entry based on the criteria used to generate the other similar data entries.
18. The medium of any one of embodiments 1-17, wherein: the fictitious data entry is determined to be different from the non-fictitious data entries based on a probabilistic data structure storing the non-fictitious entries; or that the second repository of compromised data is determined to include the fictitious data entry based on a probabilistic data structure storing the compromised data.
19. The medium of any one of embodiments 1-10, wherein the operations comprise: generating the fictitious data entry by violating one or more rules that determine a valid entry in the field.
20. The medium of any one of embodiments 1-19, wherein: the second repository has more than 10-billion entries; and the query response is provided within less than 500 milliseconds of sending the query and indicates whether the fictitious data entry matches any of the 10-billion entries.

21. A method comprising: the operations of any one of embodiments 1-20.

22. A system, comprising: one or more processors; and memory coupled to the processors and storing instructions that when executed by at least some of the processors effectuate operations comprising: the operations of any one of embodiments 1-20.

What is claimed is:

1. A tangible, non-transitory, machine-readable medium storing instructions that when executed by one or more processors effectuate operations comprising:
   obtaining, with one or more processors, a fictitious data entry associated with a field present in a plurality of records associated with an online resource, wherein:
      the fictitious data entry is generated based on a criteria used to generate non-fictitious data entries associated with the field in at least some records of the plurality of records,
      the fictitious data entry is caused to be stored in at least some records of the plurality of records in association with the field in a first set of one or more repositories to be monitored for breaches,
      the fictitious data entry is different from the non-fictitious data entries,
      the fictitious data entry complies with a syntax of the non-fictitious data entries, and
      the fictitious data entry includes at least one character that embeds information associated with the generation of the fictitious data entry into the fictitious data entry;
   sending, with one or more processors, a query to a monitoring application, the query specifying the fictitious data entry and a request to determine whether a second repository of compromised data includes the fictitious data entry, wherein the compromised data of the second repository of compromised data includes cleansed data that is periodically collected from a plurality of data sources, wherein the cleansed data includes for each fictitious data entry and each non-fictitious data entry includes metadata indicating a number of duplicates of that data entry that were discarded and that were retrieved from a unique data source of the plurality of data sources;
   in response to the query, receiving, with one or more processors, query results indicating that the second repository of compromised data includes the fictitious data entry;
   in response to the received indication that the second repository of compromised data includes the fictitious data entry, identifying, with one or more processors, at least some of the first set of one or more repositories that store the fictitious data entry;
   designating, with one or more processors, other data entries within the at least some of the first set of one or more repositories as potentially having been breached; and
   storing, with one or more processors, the designation in memory.

2. The medium of claim 1, wherein generating the fictitious data entry includes storing, in memory, a value indicative of a date on which the fictitious data entry was stored in the first set of one or more repositories.

3. The medium of claim 2, wherein the operations comprise:
   in response to the received indication that the second repository of compromised data includes the fictitious data entry, accessing, with one or more processors, the value indicative of the date on which the fictitious data entry was stored in the first set of one or more repositories; and
   inferring, with one or more processors, a date of a breach of the first set of one or more repositories based on the value.

4. The medium of claim 3, wherein within the at least some of the first set of one or more repositories as potentially having been breached comprises selecting a subset of records in the first set of one or more repositories and designating the subset of records as potentially having been breached based on the subset of records predating the inferred date.

5. The medium of claim 2, wherein the operations comprise:
   identifying, with one or more processors, a previous fictitious data entry and a next fictitious data entry, the previous fictitious data entry being stored therein before the fictitious data entry, the next fictitious data entry being stored therein after the fictitious data entry, the previous fictitious data entry being deleted from the first set of one or more repositories in response to the storing of the fictitious data entry, and the fictitious data entry being deleted from the first set of one or more repositories in response to the storing of the next fictitious data entry;
   in response to identifying the previous fictitious data entry and the next fictitious data entry, identifying, with one or more processors, a date and a time on which the previous fictitious data entry was generated and a date and a time on which the next fictitious data entry was generated;
   in response to a received indication that the second repository of compromised data does not include the previous fictitious data entry and the next fictitious data entry at a time and a date after the generation of the next fictitious data entry and in response to the received indication that the repository of compromised data includes the fictitious data entry, determining a range of time during which the first set of one or more repositories has been breached, the range of time being between a time and the date the fictitious data entry was stored in the first set of one or more repositories and a time and a date the next fictitious data entry was stored in the first set of one or more repositories.

6. The medium of claim 5, wherein a subset of the other data entries within the first set of one or more repositories is identified based on the determined range of time.

7. The medium of claim 1, wherein the operations comprise:
   identifying, with one or more processors, the first set of one or more repositories that store the fictitious data entry;
   in response to the identification of the first set of one or more repositories, identifying, with one or more processors, additional fictitious data entries generated and stored in each of the first set of one or more repositories, the respective additional fictitious data entries in each of the first set of one or more repositories being distinct from each other;
   sending, with one or more processors, another query to the monitoring application, the other query including the additional fictitious data entries and a request to determine whether a repository of compromised data includes the additional fictitious data entries;
   in response to the other query, receiving, with one or more processors, other query results indicating whether the second repository of compromised data includes one or more of the additional fictitious data entries; and identifying, with one or more processors, a subset of the first set of one or more repositories based on the other query results.

8. The medium of claim 7, wherein identifying the additional fictitious data entries within the first set of one or more repositories includes identifying a subset of the additional fictitious data entries within the subset of the first set of one or more repositories.

9. The medium of claim 1, wherein the fictitious data entry includes a set of user-authentication credentials comprising a first username and a first fictitious password and wherein the first username and the first fictitious password are generated based on the criteria used to generate other usernames and other passwords.

10. The medium of claim 9, wherein:
designating comprises determining the first username and the first fictitious password has been breached; and
the operations comprise:
causing, with one or more processors, one or more users associated with the other usernames and the other passwords to be notified to change the other passwords; and
blocking, with one or more processors, access to one or more user accounts associated with the other usernames and the other passwords that have been breached.

11. The medium of claim 1, wherein:
the fictitious data entry includes at least one of a credit card number, a gift card number, or a voucher code and wherein the credit card number, the gift card number, or the voucher code is generated based on the criteria used to generate other credit card numbers, other gift card numbers, or other voucher codes for accessing the online resource; and
the operations comprise, in response to the indication that at least one of the credit card number, the gift card number, or the voucher code has been breached, causing, with one or more processors, one or more users associated with the other credit card numbers, the other gift card numbers, or the other voucher codes to be notified of the breach.

12. The medium of claim 1, wherein:
obtaining the fictitious data entry comprises:
generating a first part of the fictitious data entry;
computing a second part of the fictitious data entry based on the first part, the second part containing redundant information relative to the first part; and
conjoining the first part and the second part in the fictitious data entry.

13. The medium of claim 1, wherein:
a set of rules specify whether a data entry in the field is valid; and
obtaining the fictitious data entry comprises:
determining more than a threshold number of characters for the fictitious data entry, the threshold being specified by one of the rules;
determining a non-alphanumeric character for the fictitious data entry to comply with one of the rules;
determining a numeric character for the fictitious data entry to comply with one of the rules; and
determining a case of a character for the fictitious data entry to comply with one of the rules.

14. The medium of claim 1, wherein the operations comprise:
periodically generating, with one or more processors, a new fictitious data entry; and
storing the new fictitious data entry in the first set of one or more repositories.

15. The medium of claim 1, wherein:
before sending the query, respective hash values are computed based on entries in the second repository of compromised data; and
the fictitious data entry is determined to be included in the second repository of compromised data with operations including:
computing a hash value based on the fictitious data entry;
determining that the hash value based on the fictitious data entry matches one of the respective hash values based on entries in the second repository of compromised data; and
in response to the match, determining the fictitious data entry is included in the second repository of compromised data.

16. The medium of claim 1, wherein:
the fictitious data entry is generated using a generative machine learning model trained on a training set including non-fictitious data entries to distinguish fictitious data entries from non-fictitious data entries.

17. The medium of claim 1, wherein the operations comprise:
prior to storing the fictitious data entry within the first set of one or more repositories, determining, with one or more processors, that the fictitious data entry is distinct from the other data entries stored within the first set of one or more repositories; and
in response to the determination that the fictitious data entry is not distinct from the other data entries stored within the first set of one or more repositories, generating, with one or more processors, another fictitious data entry based on the criteria used to generate the other data entries that are not distinct from the fictitious data entry.

18. The medium of claim 1, wherein:
the fictitious data entry is determined to be different from the non-fictitious data entries based on a probabilistic data structure storing the non-fictitious data entries; or
that the second repository of compromised data is determined to include the fictitious data entry based on a probabilistic data structure storing the compromised data.

19. The medium of claim 1, wherein the operations comprise:
generating the fictitious data entry by violating one or more rules that determine a valid entry in the field.

20. The medium of claim 1, wherein the operations comprise:
steps for generating the fictitious data entry.

21. The medium of claim 1, wherein:
the second repository has more than 10-billion entries; and
the query results are is provided within less than 500 milliseconds of sending the query and indicates whether the fictitious data entry matches any of the 10-billion entries.

22. The medium of claim 1, comprising:
steps for determining an identity score for an entity associated with the first set of one or more repositories.

23. A method, comprising:
obtaining, with one or more processors, a fictitious data entry associated with a field present in a plurality of records associated with an online resource, wherein:
- the fictitious data entry is generated based on a criteria used to generate non-fictitious data entries associated with the field in at least some records of the plurality of records,
- the fictitious data entry is caused to be stored in at least some records of the plurality of records in association with the field in a first set of one or more repositories to be monitored for breaches,
- the fictitious data entry is different from the non-fictitious data entries,
- the fictitious data entry complies with a syntax of the non-fictitious data entries, and
- the fictitious data entry includes at least one character that embeds information associated with the generation of the fictitious data entry into the fictitious data entry;

sending, with one or more processors, a query to a monitoring application, the query specifying the fictitious data entry and a request to determine whether a second repository of compromised data includes the fictitious data entry, wherein the compromised data of the second repository of compromised data includes cleansed data that is periodically collected from a plurality of data sources, wherein the cleansed data includes for each fictitious data entry and each non-fictitious data entry includes metadata indicating a number of duplicates of that data entry that were discarded and that were retrieved from a unique data source of the plurality of data sources;

in response to the query, receiving, with one or more processors, query results indicating that the second repository of compromised data includes the fictitious data entry;

in response to the received indication that the second repository of compromised data includes the fictitious data entry, identifying, with one or more processors, at least some of the first set of one or more repositories that store the fictitious data entry;

designating, with one or more processors, other data entries within the at least some of the first set of one or more repositories as potentially having been breached; and storing, with one or more processors, the designation in memory.

24. The medium of claim 1, wherein the embedded information associated with the generation of the fictitious data entry indicates at least one of time information, location information, or session information.

* * * * *